(12) United States Patent
Rowe et al.

(10) Patent No.: US 10,341,836 B2
(45) Date of Patent: Jul. 2, 2019

(54) SYSTEM AND METHOD FOR REPORTING AND TRACKING INCIDENTS

(71) Applicant: TIMELESS TECHNOLOGIES (2007) INC., Charlottetown (CA)

(72) Inventors: John L. Rowe, Charlottetown (CA); Wayd McNally, Stratford (CA); Brad D. Pineau, Stratford (CA)

(*) Notice: Subject to any disclaimer, the term of this patent is extended or adjusted under 35 U.S.C. 154(b) by 305 days.

(21) Appl. No.: 14/425,192

(22) PCT Filed: Aug. 30, 2013

(86) PCT No.: PCT/CA2013/000755
§ 371 (c)(1),
(2) Date: Mar. 2, 2015

(87) PCT Pub. No.: WO2014/032173
PCT Pub. Date: Mar. 6, 2014

(65) Prior Publication Data
US 2015/0234837 A1    Aug. 20, 2015

Related U.S. Application Data

(60) Provisional application No. 61/695,696, filed on Aug. 31, 2012.

(51) Int. Cl.
*G06F 17/30* (2006.01)
*H04W 4/90* (2018.01)
*G06F 16/9537* (2019.01)
*G06Q 10/10* (2012.01)

(52) U.S. Cl.
CPC .......... *H04W 4/90* (2018.02); *G06F 16/9537* (2019.01); *G06Q 10/10* (2013.01)

(58) Field of Classification Search
None
See application file for complete search history.

(56) References Cited

U.S. PATENT DOCUMENTS

| | | | |
|---|---|---|---|
| 5,895,450 A | 4/1999 | Sloo | |
| 7,415,129 B2 | 8/2008 | Rhoads | |
| 7,564,992 B2 | 7/2009 | Rhoads | |
| 8,041,365 B1 * | 10/2011 | Gentle | G06Q 30/02 379/265.01 |
| 8,849,911 B2 | 9/2014 | Rubinstein et al. | |
| 9,071,579 B1 | 6/2015 | Bender | |
| 2005/0060198 A1 * | 3/2005 | Bayne | A61B 5/411 705/2 |
| 2005/0065711 A1 * | 3/2005 | Dahlgren | G07C 5/008 701/117 |
| 2009/0235084 A1 * | 9/2009 | Ferraro | G06Q 10/10 713/182 |
| 2009/0249443 A1 * | 10/2009 | Fitzgerald | H04L 63/10 726/2 |
| 2010/0136954 A1 * | 6/2010 | Bennett, Jr. | H04W 4/02 455/414.1 |
| 2010/0191975 A1 | 7/2010 | Chase et al. | |

(Continued)

*Primary Examiner* — Syed H Hasan

(74) *Attorney, Agent, or Firm* — Norton Rose Fulbright Canada LLP

(57) ABSTRACT

There is provided a system and method for reporting incidents. Incident data indicative of the incident is received. At least one organization the incident is to be reported to is then determined from the incident data and the incident data is routed to the at least one organization.

23 Claims, 19 Drawing Sheets

(56) References Cited

U.S. PATENT DOCUMENTS

| | | | |
|---|---|---|---|
| 2010/0316212 A1* | 12/2010 | Fano | H04M 3/51 |
| | | | 379/265.01 |
| 2011/0063138 A1* | 3/2011 | Berkobin | G08G 1/207 |
| | | | 340/988 |
| 2011/0184982 A1 | 7/2011 | Adamousky et al. | |
| 2012/0151046 A1 | 6/2012 | Weiss et al. | |
| 2012/0201362 A1 | 8/2012 | Crossan et al. | |
| 2013/0218983 A1 | 8/2013 | Richard | |

* cited by examiner

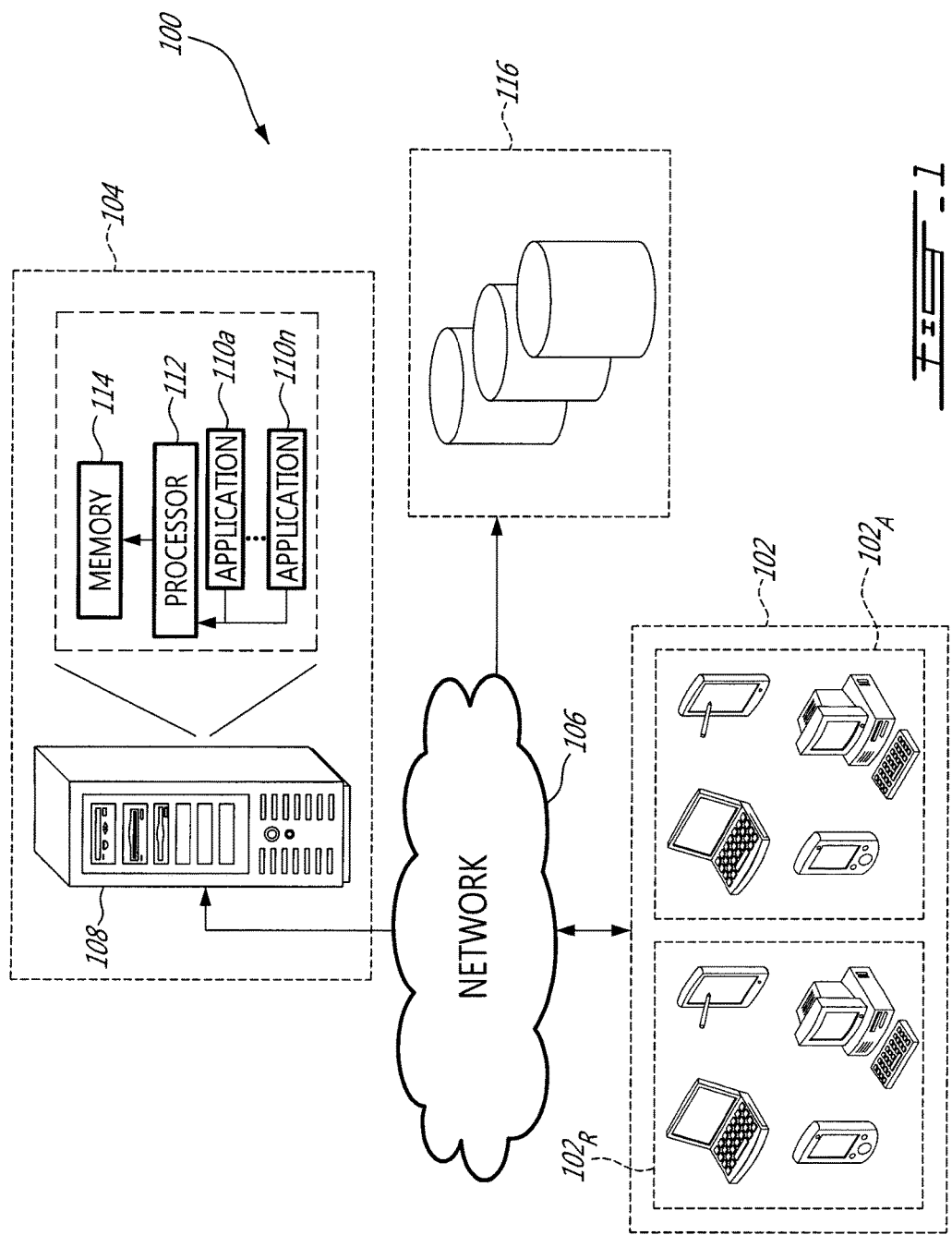

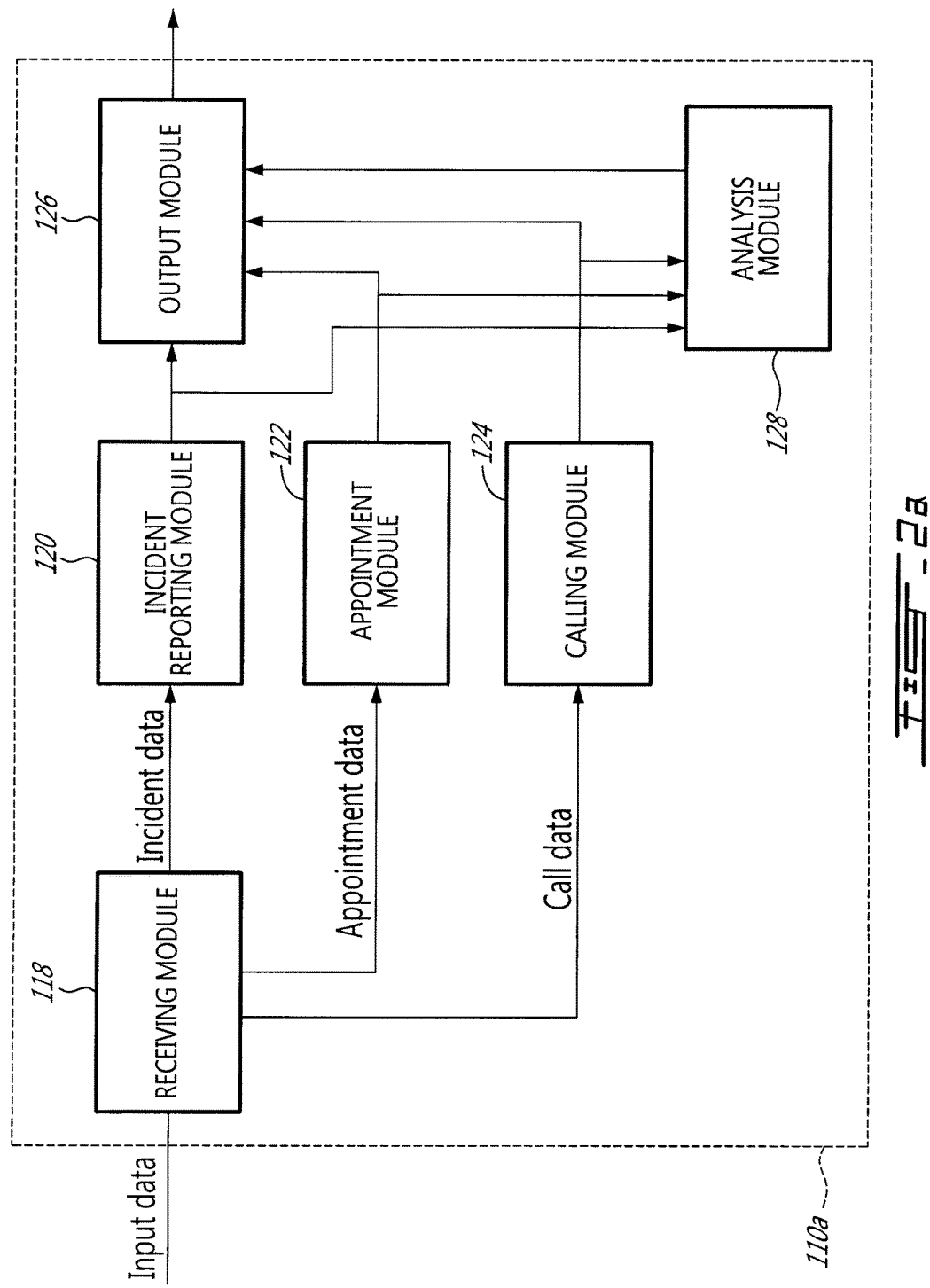

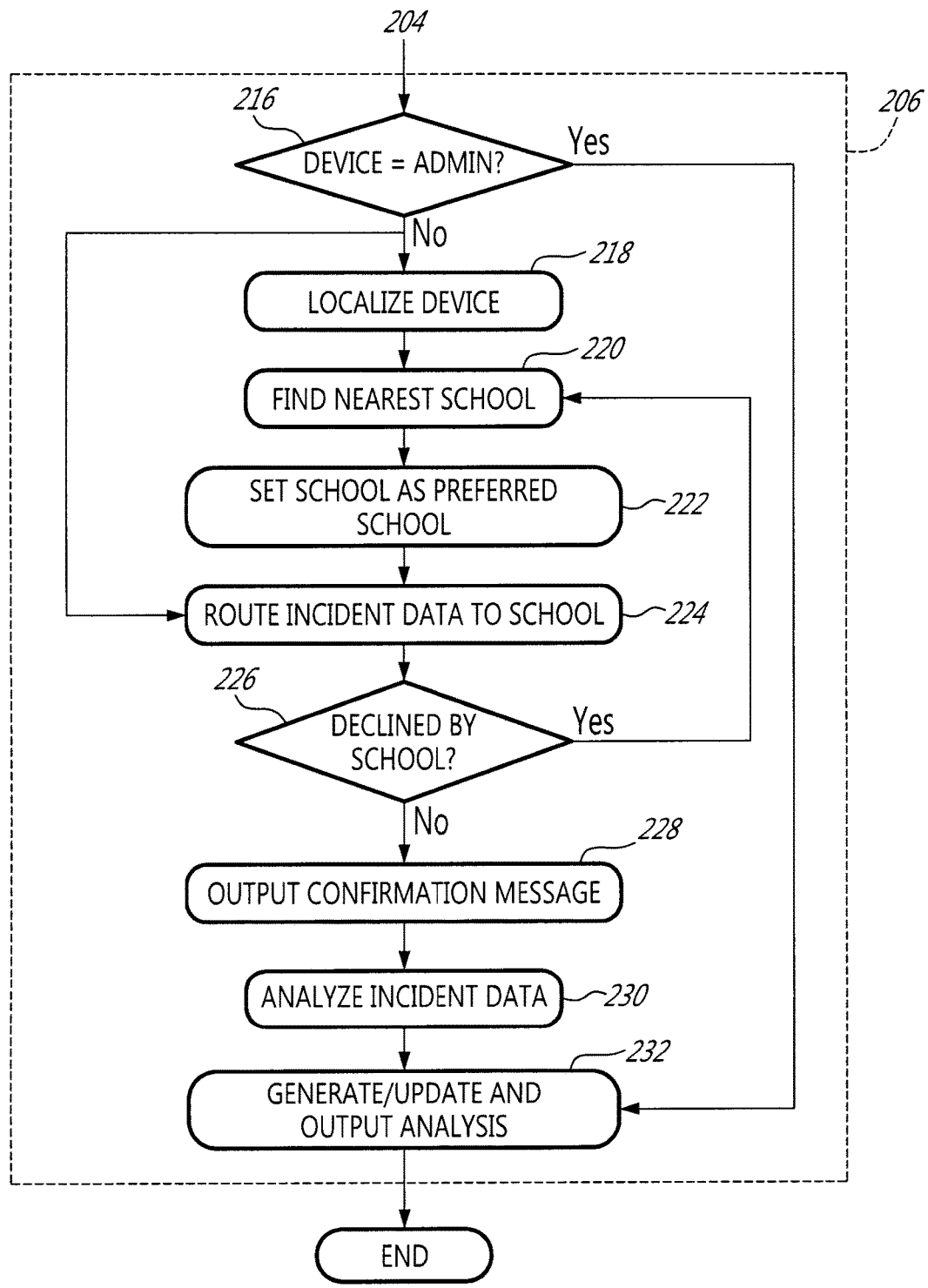

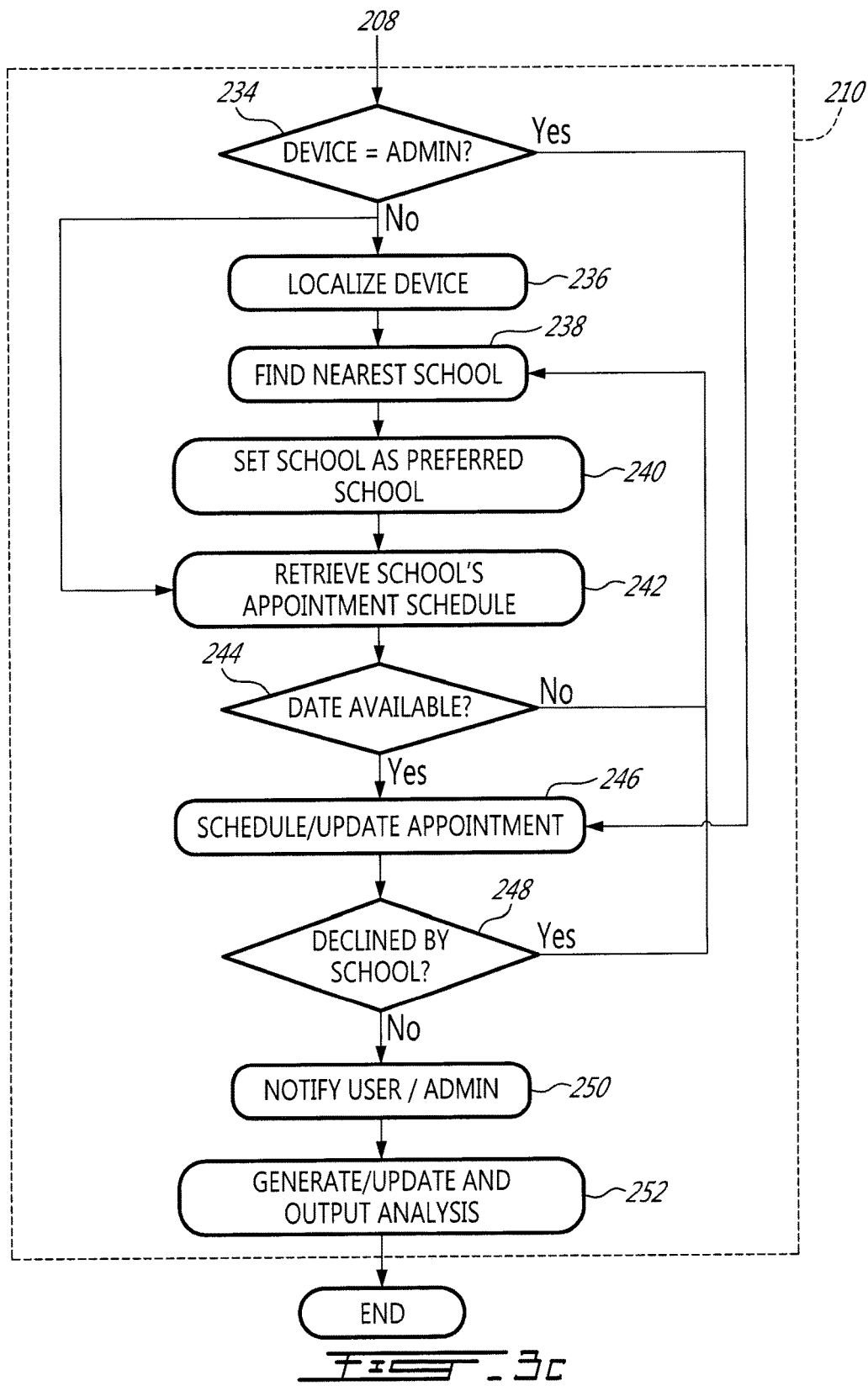

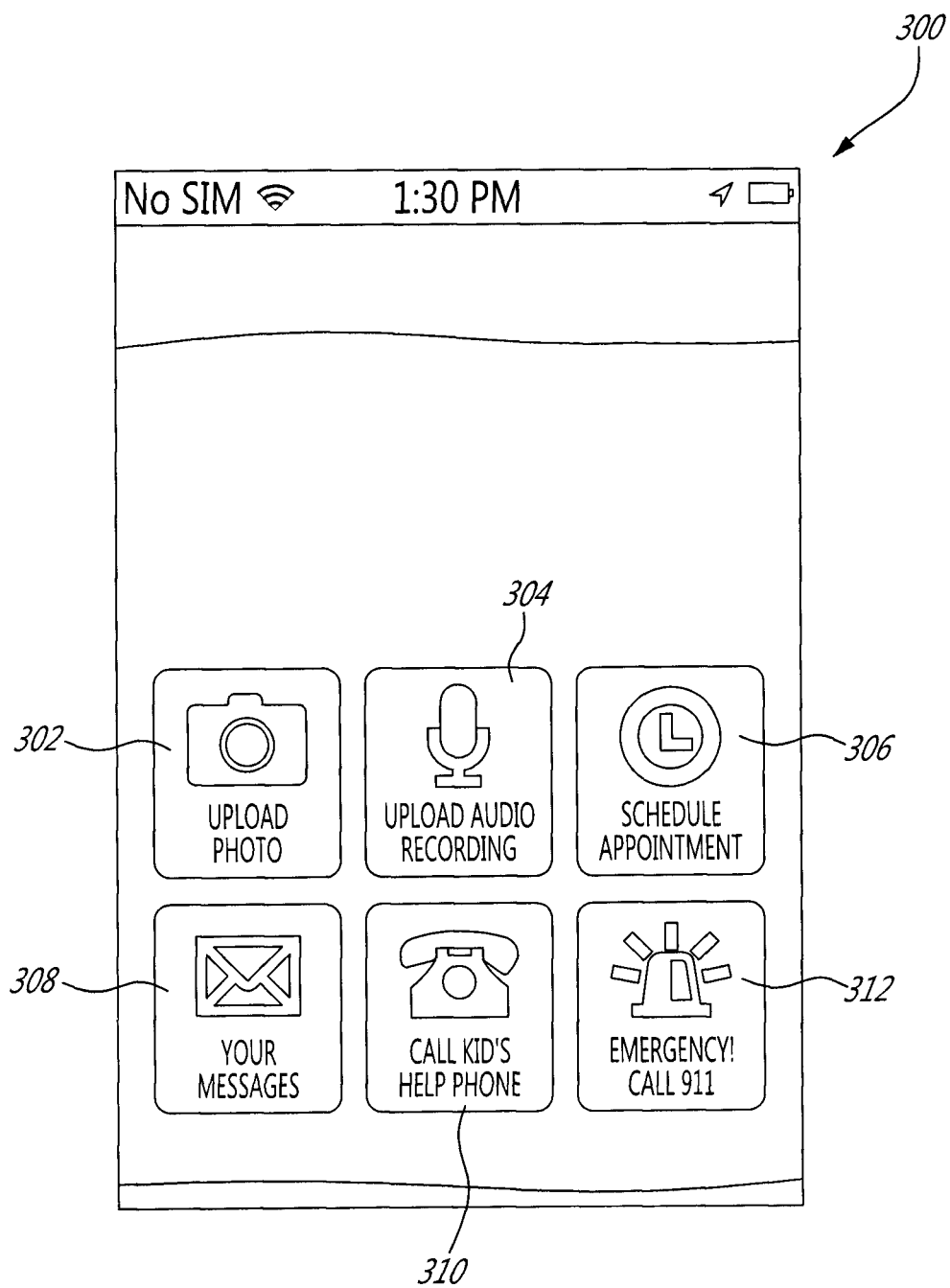

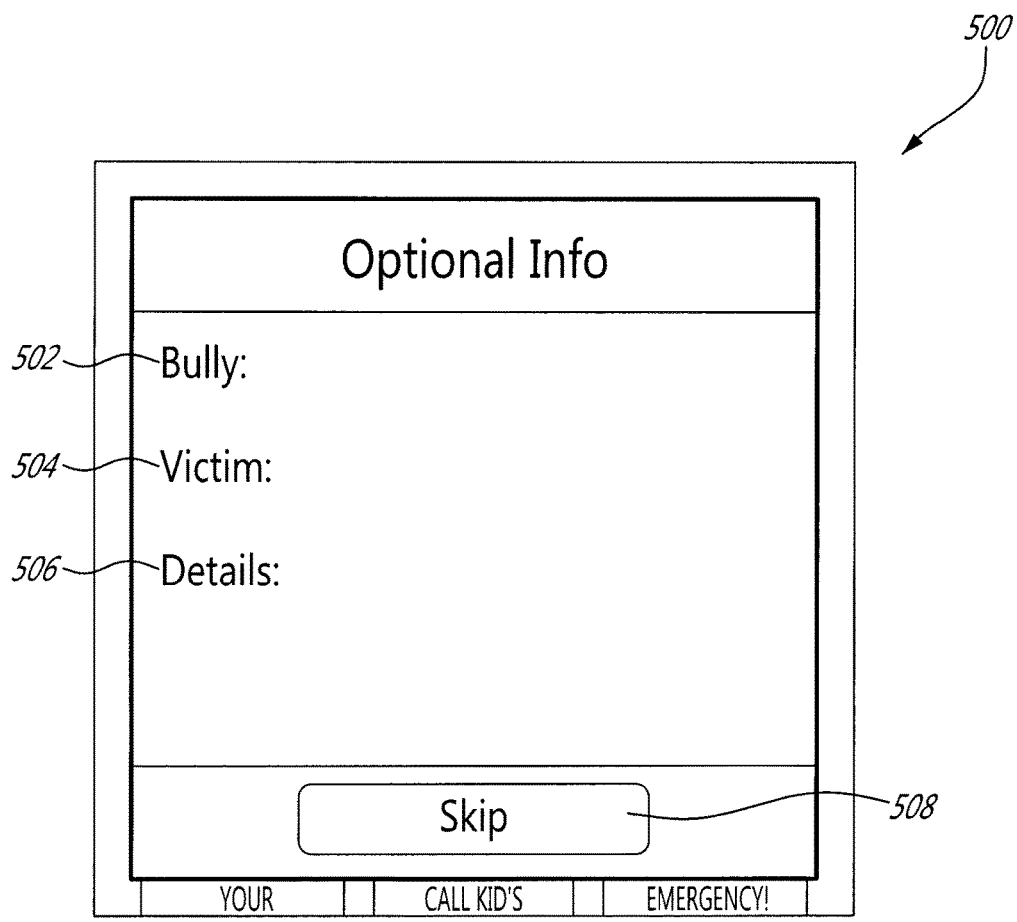

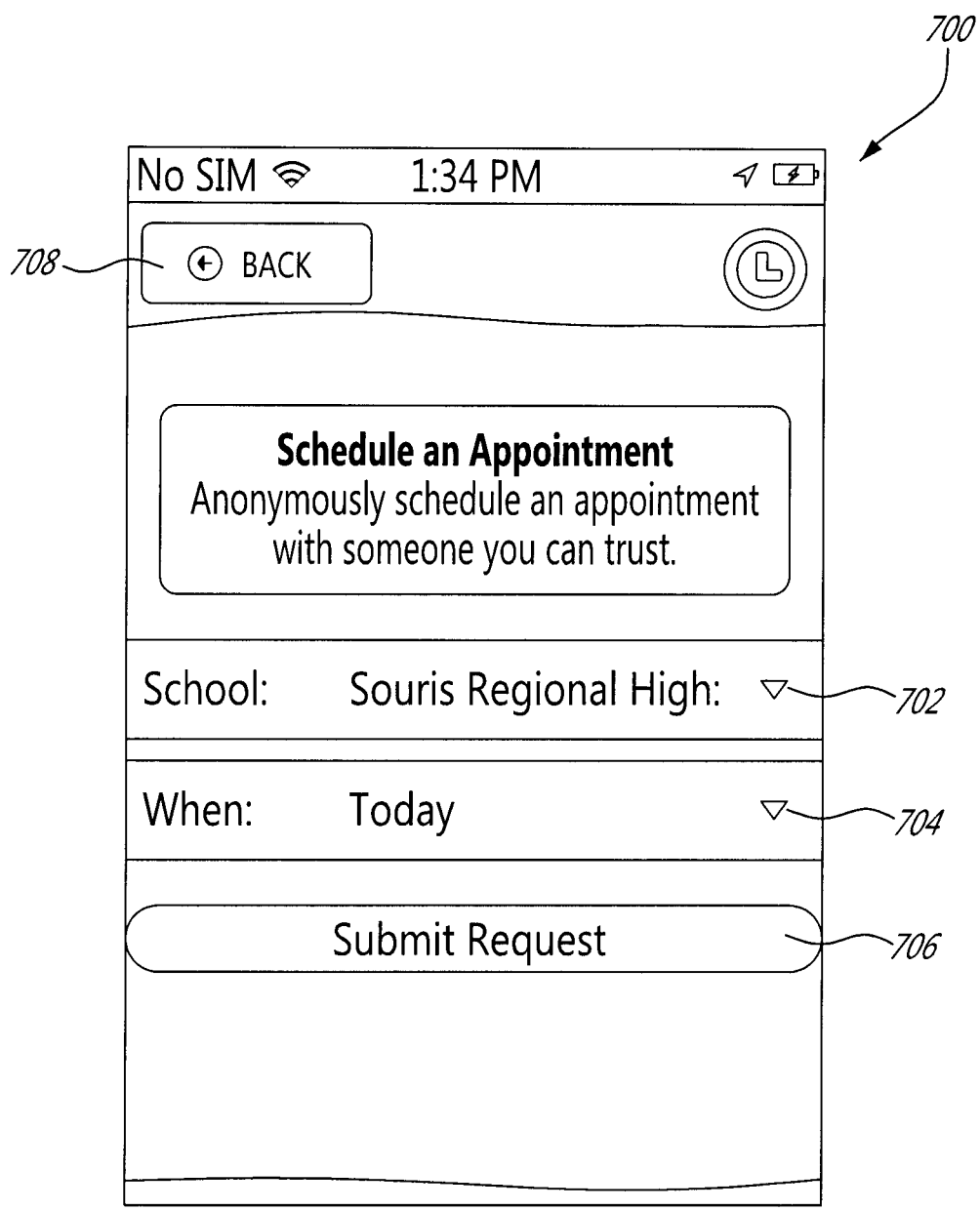

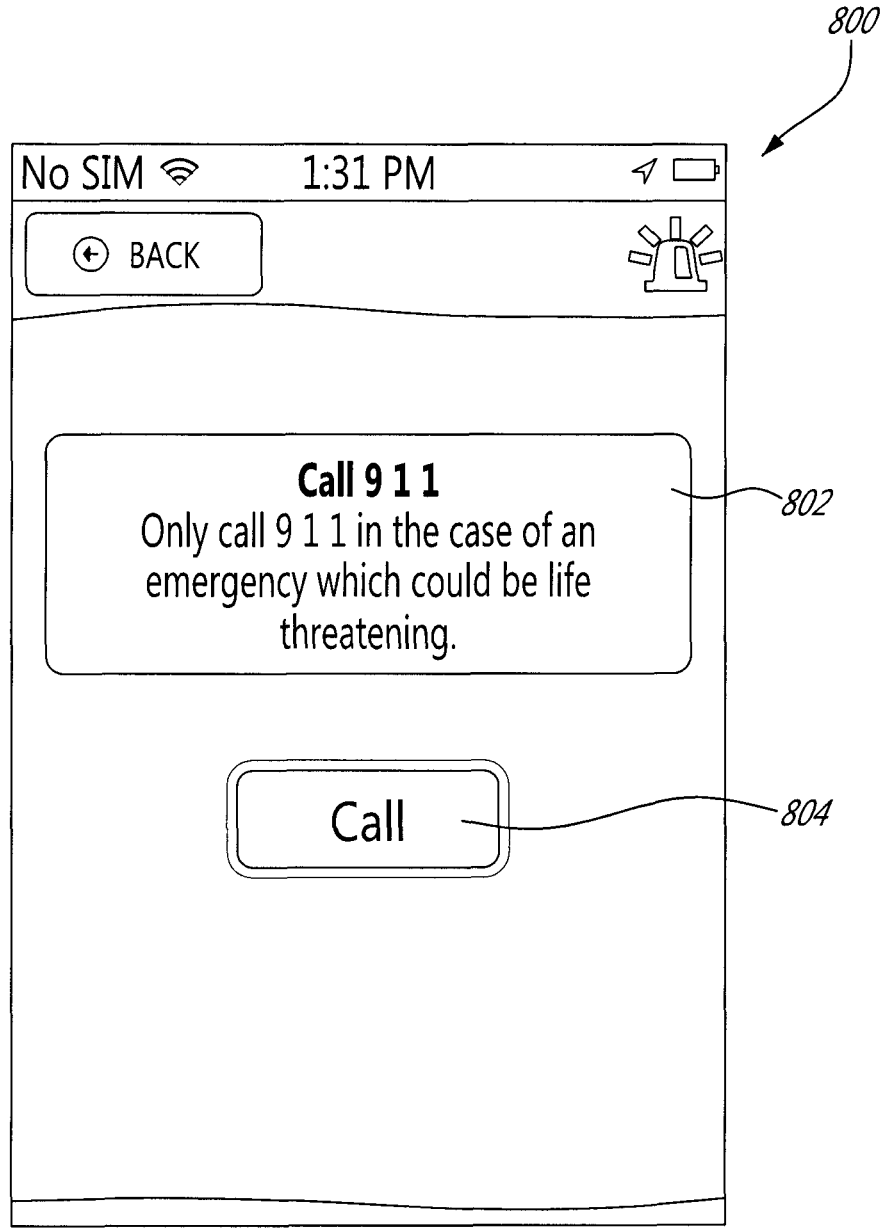

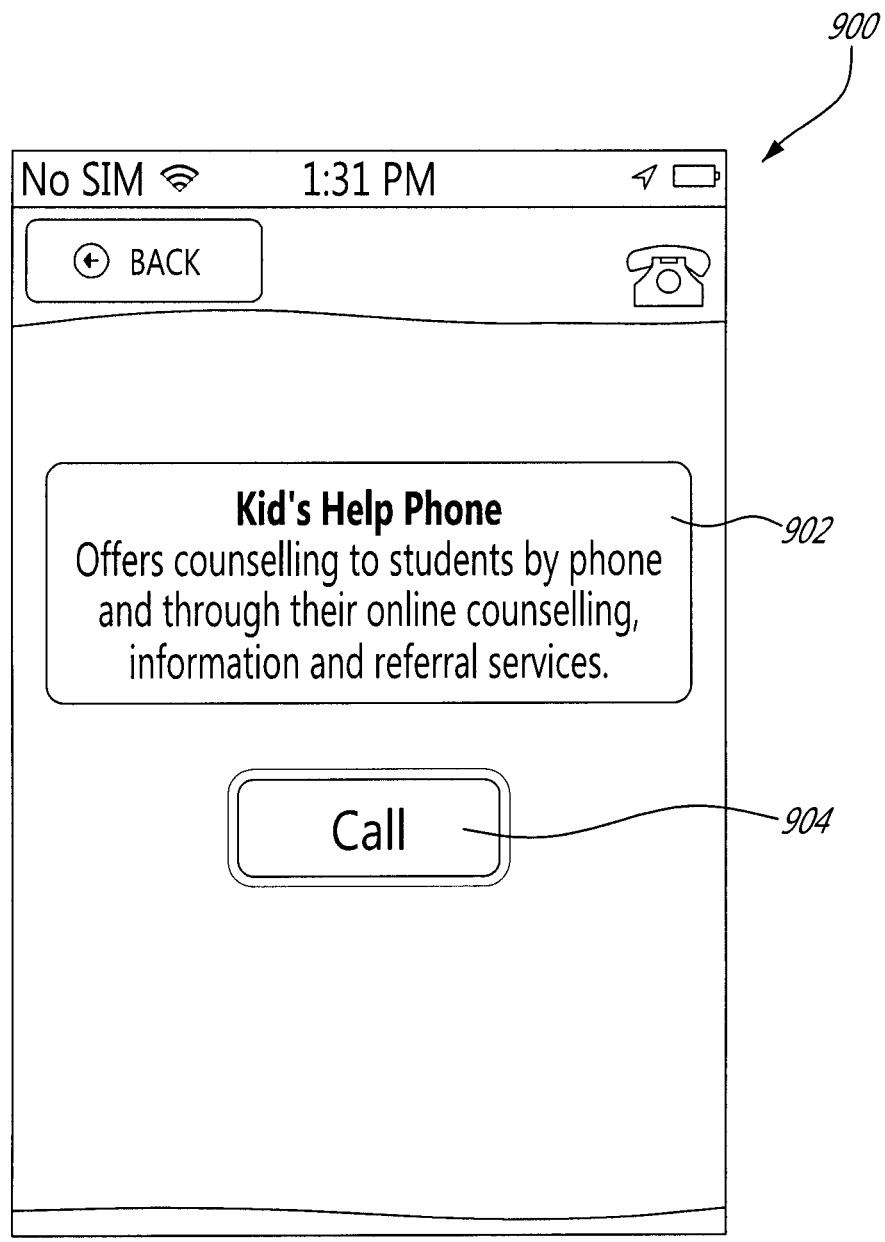

SYSTEM AND METHOD FOR REPORTING AND TRACKING INCIDENTS

CROSS-REFERENCE TO RELATED APPLICATIONS

This patent application claims priority under 35 USC § 119(e) of U.S. Provisional Application Ser. No. 61/695,696, filed on Aug. 31, 2012, the contents of which are hereby incorporated by reference.

TECHNICAL FIELD

The application relates generally to a system and method for reporting and tracking incidents.

BACKGROUND OF THE ART

Bullying incidents are on the rise in schools nationwide. However, students are not provided with means to safely report bullying incidents they may be victims of or may have witnessed. Indeed, students who report such incidents are at the risk of becoming a target themselves and are therefore reluctant to provide any information to school officials.

There is therefore a need for an improved system and method for reporting and tracking incidents.

SUMMARY

In accordance with a first broad aspect, there is provided a system for reporting an incident, the system comprising a memory; a processor; and at least one first application stored in the memory and executable by the processor for receiving incident data indicative of the incident, determining from the incident data at least one organization the incident is to be reported to, and routing the incident data to the at least one organization.

In accordance with a second broad aspect, there is provided a computer-implemented method for reporting an incident, the method comprising executing on a processor program code for receiving incident data indicative of the incident; determining from the incident data at least one organization the incident is to be reported to; and routing the incident data to the at least one organization.

In accordance with a third broad aspect, there is provided a computer readable medium having stored thereon program code executable by a processor for reporting an incident, the program code executable for receiving incident data indicative of the incident; determining from the incident data at least one organization the incident is to be reported to; and routing the incident data to the at least one organization.

DESCRIPTION OF THE DRAWINGS

Reference is now made to the accompanying figures in which:

FIG. 1 is a schematic diagram of a system for reporting and tracking incidents, in accordance with an illustrative embodiment;

FIG. 2a is a schematic diagram of an application running on the processor of FIG. 1;

FIG. 2b is a schematic diagram of the incident reporting module of FIG. 2a;

FIG. 2c is a schematic diagram of the appointment module of FIG. 2a;

FIG. 2d is a schematic diagram of the calling module of FIG. 2a;

FIG. 3b is a flowchart of the step of FIG. 3a of processing incident data;

FIG. 3c is a flowchart of the step of FIG. 3a of scheduling an appointment;

FIG. 4 is a screen capture of a user interface for reporting and tracking incidents, in accordance with an illustrative embodiment;

FIG. 5b is a screen capture of the user interface of FIG. 5a with a pop-up screen for entering optional complementary information;

FIG. 6 is a screen capture of a user interface for scheduling an appointment, in accordance with an illustrative embodiment;

FIG. 7 is a screen capture of a user interface for making a 911 call, in accordance with an illustrative embodiment;

FIG. 8 is a screen capture of a user interface for making a call to a Kid's Help Phone line, in accordance with an illustrative embodiment;

FIG. 9b is a screen capture of an incident report being presented on the administrator interface of FIG. 9a; and FIG. 9c is a screen capture of a guidance appointment request being presented on the administrator interface of FIG. 9a.

DETAILED DESCRIPTION

Figure 2B:
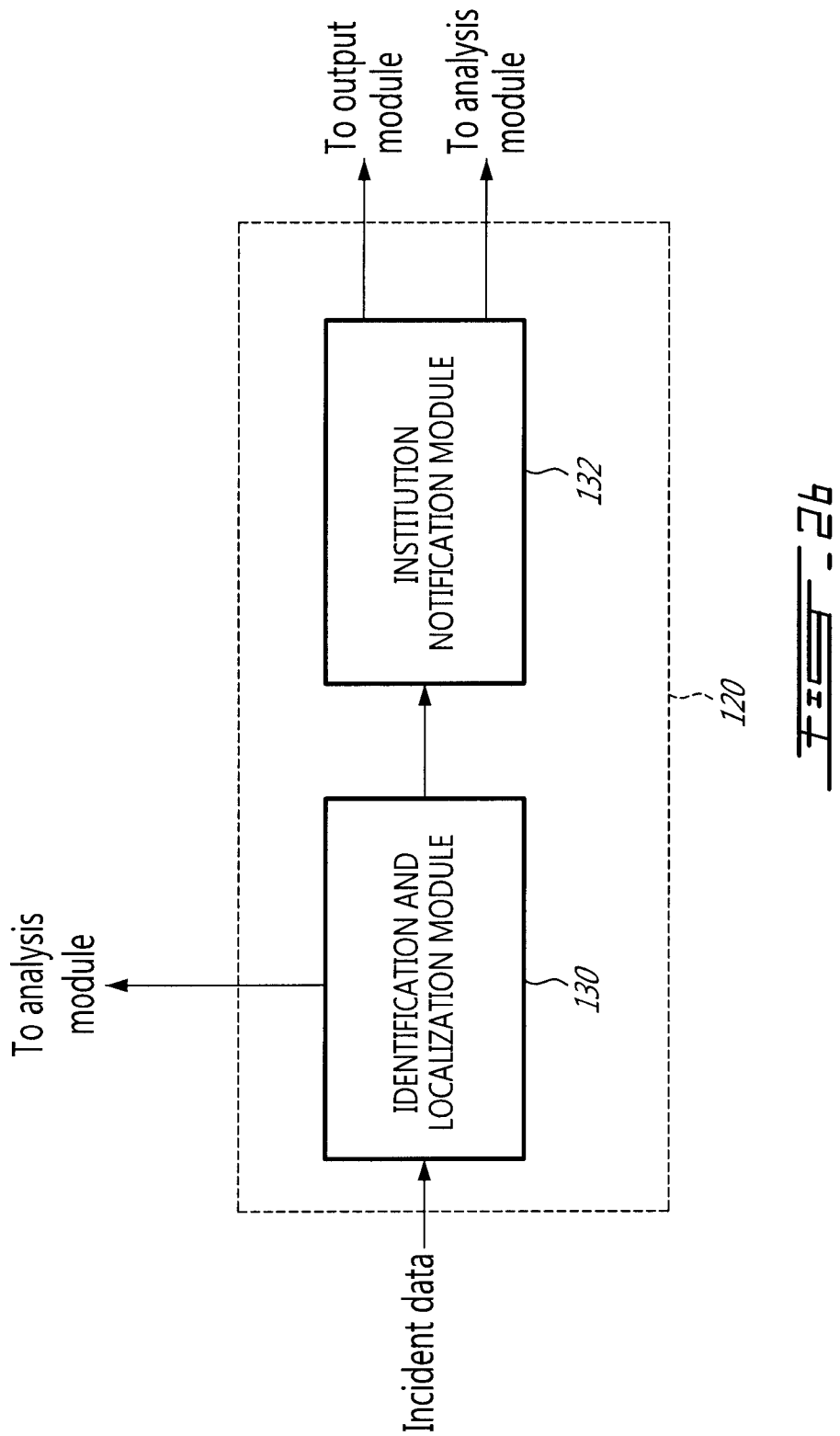

Referring to FIG. 1, there is illustrated a system 100 for reporting and tracking incidents, such as bullying incidents. The system 100 comprises a plurality of devices as in 102 adapted to communicate with a bullying incident reporting and tracking system 104 over a network 106. The devices 102 may comprise any device, such as a personal computer, a personal digital assistant, a smart phone, or the like, which is configured to communicate over the network 106, such as the Internet, the Public Switch Telephone Network (PSTN), a cellular network, or others known to those skilled in the art. The devices 102 may comprise reporting devices $102_R$ utilized by users, such as students or parents, to report a bullying incident and administrator devices $102_A$ used by administrators, such as school officials, to review reported instances of bullying, as will be discussed further below. Although illustrated as being separate and remote from the devices 102, it should be understood that the bullying incident reporting and tracking system 104 may also be integrated with the devices 102, either as a downloaded software application, a firmware application, or a combination thereof.

It should be understood that the bullying incidents described below may occur at places other than school yards, e.g. in a nearby park or mall. In addition, incidents other than bullying incidents, such as assaults, selling of drugs, and the like, may be reported. Also, although the description refers to bullying incidents occurring near or at a school, it should also be understood that the system 104 may be used to report incidents occurring in any other type of organization or institution. For example, the system 104 may be used to report incidents occurring in a workplace environment. It should then be understood that the administrator devices 102$_A$ may accordingly be used by any relevant authority, such as a police department, a safety group or system, or a consumer group.

The bullying incident reporting and tracking system 104 illustratively comprises one or more server(s) accessible via the network 106. For example, a series of servers corresponding to a web server, an application server, and a database server may be used. These servers are all represented by server 108. The server 108 may be accessed by a user using one of the devices 102$_R$ or an administrator using one of the devices 102$_A$. The server 108 may comprise, amongst other things, a plurality of applications 110a ... 110n running on a processor 112 coupled to a memory 114. It should be understood that while the applications 110a ... 110n presented herein are illustrated and described as separate entities, they may be combined or separated in a variety of ways.

One or more databases 116 may be integrated directly into the memory 114 or may be provided separately therefrom and remotely from the server 108 (as illustrated). In the case of a remote access to the databases 116, access may occur via any type of network 106, as indicated above. The various databases 116 described herein may be provided as collections of data or information organized for rapid search and retrieval by a computer. The databases 116 may be structured to facilitate storage, retrieval, modification, and deletion of data in conjunction with various data-processing operations. The databases 116 may consist of a file or sets of files that can be broken down into records, each of which consists of one or more fields. Database information may be retrieved through queries using keywords and sorting commands, in order to rapidly search, rearrange, group, and select the field. The databases 116 may be any organization of data on a data storage medium, such as one or more servers.

In one embodiment, the databases 116 are secure web servers and Hypertext Transport Protocol Secure (HTTPS) capable of supporting Transport Layer Security (TLS), which is a protocol used for access to the data. Communications to and from the secure web servers may be secured using Secure Sockets Layer (SSL). Identity verification of a user may be performed using usernames and passwords for all users. Various levels of access rights may be provided to multiple levels of users.

Alternatively, any known communication protocols that enable devices within a computer network to exchange information may be used. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol)

The memory 114 accessible by the processor 112 may receive and store data. The memory 114 may be a main memory, such as a high speed Random Access Memory (RAM), or an auxiliary storage unit, such as a hard disk, a floppy disk, or a magnetic tape drive. The memory 114 may be any other type of memory, such as a Read-Only Memory (ROM), or optical storage media such as a videodisc and a compact disc.

The processor 112 may access the memory 114 to retrieve data. The processor 112 may be any device that can perform operations on data. Examples are a central processing unit (CPU), a front-end processor, a microprocessor, and a network processor. The applications 110a ... 110n are coupled to the processor 112 and configured to perform various tasks as explained below in more detail. An output may be transmitted to the devices 102.

FIG. 2a is an exemplary embodiment of an application 110a running on the processor 112. The application 110a may comprise a receiving module 118, an incident reporting module 120, an appointment module 122, a calling module 124, an output module 126, and an analysis module 128.

The receiving module 118 may receive input data from a user accessing the system 104. For example, a student victim of a bullying incident or witnessing such an incident may upload to the system 104 using their device 102$_R$ incident data, such as a photo, video, or audio recording, related to the incident. It should be understood that the incident data uploaded to the system 104 may also comprise text messages, email, or the like. In particular, the student may access the system 104 via a software application downloaded on their device 102$_R$. This application allows the student to capture media relating to the bullying incidents and anonymously transmit the data to the system 104 for review by school administration or other officials. It should however be understood that a student or other person wishing to report an incident may alternatively or additionally access the system 104 via an online website or portal associated therewith using their reporting device 102$_R$. In this case, the media captured by the reporting device 102$_R$ may be uploaded to the system 104 via the portal or website for routing to the suitable organization.

In addition, the system 104 may be accessed through an online social network or social networking application (e.g. Facebook™, Google+™, Twitter™ or the like) to which a user wishing to report the incident has subscribed. In this case, a software widget or other suitable software application may be tied to the online social network or social networking application for provide the user access to the system 104. In particular, the widget may be used by the user to submit incident data to the system 104. In one embodiment, the widget may indeed enable the user to provide information, e.g. text, detailing the incident or upload captured media to the system 104. When reporting incidents occurring online, for instance cyber-bullying incidents occurring on the social network, the user (e.g. a parent) may also acquire a capture of a screen presented on their device 102$_R$. This screen capture may be indicative of occurrence of the cyber-bullying incident and can be subsequently uploaded to the system 104 via the widget.

When a software application downloaded on the device 102$_R$ is used to report bullying incidents, the application may, upon being started, launch a media capture device (not shown), such as a camera or a sound recorder, provided on the reporting user's device 102$_R$. The capture of the undergoing bullying incident may therefore be initiated. Once the incident has been captured, the application sends the media file(s), e.g. photo, video, or audio file(s), representative of the incident to the system 104. The application may further prompt the user to provide additional details about the bullying event, such as the name(s) of the perpetrator(s) of the incident, i.e the bully, and victim name(s), if known. Comments about the incident may also be provided and attached to the captured media file(s). This optional information may further be sent to the system 104, which receives an incident information package comprising the media file(s) and/or incident details/comments. A unique identifier of the reporting device 102$_R$ the information package came from may further be transmitted to the system 104.

The identifier may comprise a ten (10)-digit mobile phone number or an International Mobile Equipment Identity (IMEI) number. In this manner, users are able to supply incident information to the system 104 anonymously as the device's identifier may be used for identification purposes. Once the incident data has been sent, the application may be automatically exited, thereby increasing confidentiality as the reporting user is prevented from being caught with the application open.

An administrator may submit to the system 104 additional details about an incident, which has been previously reported in the manner described above. In particular, the administrator may review incident reports by accessing the system 104 using their administrator device $102_A$. Such access may be effected by launching an application downloaded on the device $102_A$, as discussed above, or by accessing a website associated with the system 104. In the latter case, the administrator may be required to log in to the system 104 using a unique identifier, e.g. username and password, the administrator would have been provided with upon registering with the system 104. After accessing the system 104, the administrator may then update previously submitted incident reports by inputting any relevant information related thereto. For example, upon reviewing an incident report submitted by a user and for which the user was unable to identify the individuals involved, the administrator may be able to identify these individuals. In this case, the administrator may then submit the names of the individuals to the system 104 in order to update the incident report. These names and any other update information may be received at the receiving module 118 along with the unique identifier of the administrator device $102_A$.

The input data received at the receiving module 118 may further comprise appointment data. Indeed, the receiving module 118 may receive a request for a guidance counsellor appointment submitted to the system 104 by a student or other user through their device $102_R$. The appointment data may comprise a school whose guidance counsellor the user wishes to meet with, and a preferred time and location for the appointment. In order to ensure user anonymity, the appointment data may further comprise a request identification number and/or an identifier of the device $102_R$ that submitted the appointment request. The appointment data received at the receiving module 118 may further comprise update information, e.g. a new time or location, for a scheduled appointment. This update information may be submitted by the administrator to the system 104 using their device $102_A$ and may be stored in the databases 116 along with the request identification number for subsequent access by the system 104. Any update received at the system 104 from an administrator device $102_A$ may be retrieved by a reporting device $102_R$ upon the latter accessing the system 104.

Call data comprising a phone number to be dialled may also be received at the receiving module 118. Indeed, a user, such as a student, may further use the application provided on his/her device $102_R$ to make a 911 emergency call or a call to a Kid's Help Phone line providing counselling services, as will be discussed further below. The call data may also comprise confirmation data for making the selected call. Although the received call data is described herein as comprising a phone number to be dialled, it should be understood that the call data may only comprise an indication that a call to a crisis service, such as the 911 emergency service or the Kid's Help Phone Line, is requested. The calling module 124 may then retrieve from the memory 114 and/or databases 116 the phone number associated with the requested crisis service.

Upon receiving the input data, the receiving module 118 illustratively discriminates between incident data, appointment data, and call data for transmission to the appropriate one of the modules 120, 122, and 124. In particular, the receiving module 118 sends the incident data to the incident reporting module 120, the appointment data to the appointment module 122, and the call data to the calling module 124.

Referring to FIG. 2b, the incident reporting module 120 illustratively comprises an identification and localization module 130 and an institution notification module 132. The identification and localization module 130 may be used to determine whether the device 102 from which the incident data originates is an administrator device $102_A$ or a reporting device $102_R$. This determination may be done by comparing the device identifier to a list of administrator device identifiers stored in the databases 116. If the identification and localization module 130 determines that the device 102 is not an administrator device $102_A$ but rather a reporting device $102_R$, this implies that the received incident data comprises an incident information package submitted by a student or the like. The identification and localization module 130 may then be used to acquire the localization, e.g. Global Positioning System (GPS) localization, of the device $102_R$ from which the input data has been received. For this purpose, the device $102_R$ may be GPS-enabled and the identification and localization module 130 may analyze the signals received from the device $102_R$ to retrieve the device's coordinates. Once the geographic location of the device $102_R$ is known, the identification and localization module 130 may then transmit the incident data, i.e. the received incident information package, along with the device's coordinates to the institution notification module 132.

It should be understood that, the incident data may indicate the school at which the bullying incident occurred. As such, the identification and localization module 134 may not need to localize the device $102_R$ and the incident data may be routed directly by the institution notification module 132 to school specified in the received incident data. Although illustrated as a single module for the sake of clarity, it should also be understood that the identification and localization module 130 may comprise separate modules, e.g. an identification module and a localization module.

On the basis of the received data and in cases where the incident data comprises no school identification, the institution notification module 132 may search the databases 116 for the school that is in closest proximity to the device's location. The databases 116 may indeed store a list of all schools within a given geographic area along with the geographic location of each school. The institution notification module 132 is therefore able to find the school whose location is the closest to that of the device $102_R$. For this purpose, the institution notification module 132 may compare the location of the device $102_R$ to that of the schools listed in the databases 116 and determine which school is within a predetermined distance of the device $102_R$. This school can be assumed to be the home school of the user of the device $102_R$. Once the school is found, the institution notification module 132 may indicate this school as being a preferred or highest priority school to which all future incident data received from the device $102_R$ are to be routed. This may be effected by providing the school with a priority number from 1 to n, with 1 being the highest priority level, and appending the appropriate priority number to the data associated with the school at hand in the databases 116. Alternatively, if the same school is identified as being in closest proximity to the device $102_R$ over a series of information package submissions from the device $102_R$, the school may be indicated as being the preferred school. It should be understood that the incident data may be sent to more than one school, e.g. five (5) schools, and the institution notification module 132 may therefore seek for the five (5) schools in closest proximity to the device $102_R$.

The institution notification module 132 may then transmit the incident data to the output module 126 so the latter may format the data for transmission to the identified school. The data may be communicated to the school via email, Short Message Service (SMS), Multimedia Messaging Service (MMS), instant messaging (IM), or other suitable communication means known to those skilled in the art. The data may be received on at least one device as in $102_A$ provided at the school. The output module 126 may also format the data for rendering on an interface (not shown) presented on the device(s) $102_A$. The data received at the device(s) $102_A$ may then be accessed by an administrator to review the incident information package.

Once received at the school, the incident information package may be declined if it is determined by school officials that the involved parties do not belong to the school. This may occur if the incident data has been routed to the preferred school, which has for instance been identified over a series of submissions from the same device $102_R$, as discussed above. The reported incident may however have occurred in a location, such as school, different from the preferred school. This may occur if a student meets a friend at their school, which is remote from the student's home school, and witnesses or is victim of a bullying incident at the friend's remote school. In this case, the school that should be notified is not the student's home school but the friend's school. Upon being notified, the student's home school, i.e. the preferred school, may therefore decline the received information package and transmit a rejection message to the system 104. The rejection message may be received at the receiving module 118, transmitted to the identification and localization module 130, and then to the institution notification module 132 of the incident reporting module 120. At this point, the institution notification module 132 may proceed with a new search to identify the school, i.e. the friend's school, that is in closest proximity to the location of the reported incident. The notification process described above may then be repeated to notify the friend's school.

Once the information package has been transmitted and accepted at a given school, e.g. an approval message indicative of acceptance of the information package has been transmitted by the school to the system 104, the output module 126 may generate a confirmation message for transmission to the device $102_R$ that submitted the incident data. The institution notification module 132 may also store the information package in the databases 116 along with information indicating the location the information package has been received from, a date and time the information package was received, and that the information package was successfully transmitted to the school.

It may be desirable for the system 104 to generate analyses and other studies that present users with information related to reported bullying incidents. For instance, administrators may wish to view the number of instances of bullying incidents within a given area or obtain statistics about bullying incidents reported in the proximity of a specific school. To implement this feature, the institution notification module 132 may send the incident data along with the device coordinates and the location of the school to which the incident information package has been sent to the analysis module 128. The analysis module 128 may then analyze the data to generate incident analyses.

For example, the analysis module 128 may retrieve the number of information packages received within a given radius, e.g. five (5) kilometers, of the device's location over a given period of time, e.g. the past six (6) months. The analysis module 128 may then compute the total number of information packages received up to the current date and compare the computed number to a predetermined threshold retrieved from the databases 116. For example, the computed number may be compared to a national or regional average number of bullying incidents stored in the databases 116. Administrators may then be provided with a tool for assessing the criticality of bullying incidents over a given period and within a given area. Also, on the basis of the school location received from the institution notification module 132, the analysis module 128 can retrieve previous incident information packages received for the specified school over a given period. Patterns may then be identified by correlating the received incident data to data from the previous packages.

The analysis module 128 may then compile the data resulting from the analysis and generate incident analyses or studies accordingly. As will be discussed further below, the analyses may comprise summaries, tables, charts, graphs, and the like. Each analysis or study may then be sent to the output module 126 for transmission to the devices 102 using a suitable communication means discussed above. In one embodiment, the generated analyses are sent to the administrator devices $102_A$ only but it should be understood that depending on the level of confidentiality of the analyses, the latter may be sent to all devices 102, whether administrator devices $102_A$ or reporting devices $102_R$. In order to provided added security and confidentiality, various authority levels may be provided to the holders of the devices 102. For instance, students may not be allowed to view the analyses transmitted to their devices $102_R$ while parents may be provided full access thereto.

As discussed above, an administrator, such as a school official, may wish to update a previously generated incident with additional information, such as details as to the names of individuals involved in the bullying incident. The identification and localization module 130 may therefore be used to determine from the identifier of the device 102 whether the incident data is received from an administrator device $102_A$ or from a reporting device $102_R$, as discussed above. If the received identifier matches one of the stored administrator device identifiers, it can be determined that the incident data is received from an administrator. In this case, the incident data may comprise update information, as discussed above, and may therefore be sent directly to the analysis module 128. The analysis module 128 may then update a previously generated incident report stored in the databases 116 with the received incident data. The updated incident may then be sent to the output module 126 for transmission at least to the administrator devices $102_A$.

Figure 2C:
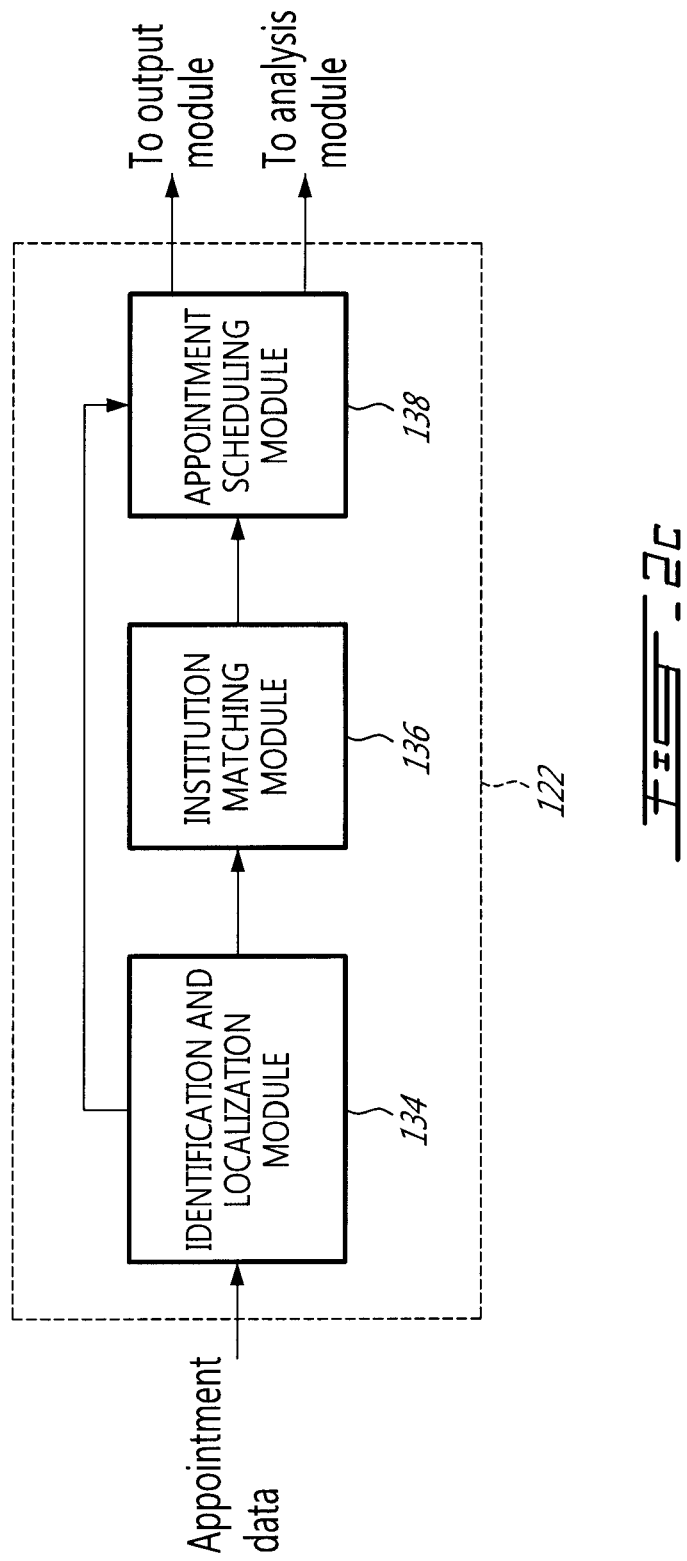

Referring to FIG. 2c, the appointment module 122 illustratively comprises an identification and localization module 134, an institution matching module 136, and an appointment scheduling module 138. The identification and localization module 134, similarly to the identification and localization module 130, may first determine from the device identifier whether the appointment data is received from a reporting device $102_R$ or from an administrator device $102_A$. If the data is received from an administrator device $102_A$, this implies that the appointment comprises appointment update information. The identification and localization module 134 may therefore transmit the received data to the appointment scheduling module 138 to update a previous appointment generated by the latter, as will be discussed further below. The appointment scheduling module 138 subsequently sends the updated appointment to the output module 126 for transmission to the devices 102 as well as to the analysis module 128 for updating any previously generated analyses.

If it is determined that the appointment data is received from a reporting device $102_R$, this implies that an appointment request has been received. The identification and localization module 134 may optionally localize the device $102_R$ in the manner described above. It should be understood that, since the appointment data may comprise a school whose guidance counsellor the user desires to meet, the identification and localization module 134 may not need to localize the device $102_R$ and the appointment data may be sent directly to the appointment scheduling module 138 for scheduling the appointment. When it is needed to identify an institution where the appointment should be made, the identification and localization module 134 transmits the localization information and the appointment data to the institution matching module 136. The institution matching module 136 then searches the databases 116 to determine the available school(s) in closest proximity to the device $102_R$, as discussed above. The institution matching module 136 may further associate a priority level to the identified school(s) in order to route all future appointment data received at the system 104 from a reporting device $102_R$ to the identified school(s). The institution matching module 136 may then transmit to the appointment scheduling module 138 the localization data, the appointment data, and an identification of the school for which an appointment is sought, if not already provided in the appointment data.

Upon receiving the data, the appointment scheduling module 138 may then retrieve from the databases 116 the appointment schedule of the appropriate school among a plurality of school appointment schedules stored in the databases 116. The school appointment schedule may indicate the dates and times for which the school's guidance counsellor is available and the location where meetings are to take place for each available date. The appointment scheduling module 138 may then search the schedule for the next available date or for a specific date if so specified in the received appointment data. If no date is found, the appointment scheduling module 138 may generate an alert that is sent to the output module 126 for transmission to at least the reporting device $102_R$. Otherwise, once a date is found, the appointment scheduling module 138 may schedule the appointment by entering details thereof, e.g. date, time, location, in the appointment schedule and storing the appointment information in the databases 116. The appointment details may then be sent to the output module 126 for transmission to the administrator devices $102_A$ of the identified school. As discussed above, the appointment may be declined if an appointment has been scheduled at the school closest to the device $102_R$ but the student was visiting a remote school, such as their friend's school. In this case, an appointment should be made to the student's home school rather than the friend's school. The scheduled appointment may therefore be declined at the school and a rejection message may be received at the system 104. The received rejection message may then be routed to the identification and localization module 134 then to the institution matching module 136 where a new search for a school may be performed.

Once an appointment schedule has been accepted by a given school, a confirmation message comprising the appointment details may be sent by the output module 126 to the devices $102_A$ and $102_R$. This confirmation message may trigger the creation of a generic calendar appointment in the administrator devices $102_A$ and the reporting device $102_R$.

The appointment details output by the appointment scheduling module 138 may also be transmitted to the analysis module 128 so the latter may incorporate the appointment information in the incident analyses. For example, the analysis module 128 may generate analyses indicating the follow-up, if any, effected for a given bullying incident. This follow-up may include all responses, either positive or negative, to guidance counsellor appointment requests received at the appointment module 122.

Figure 2D:
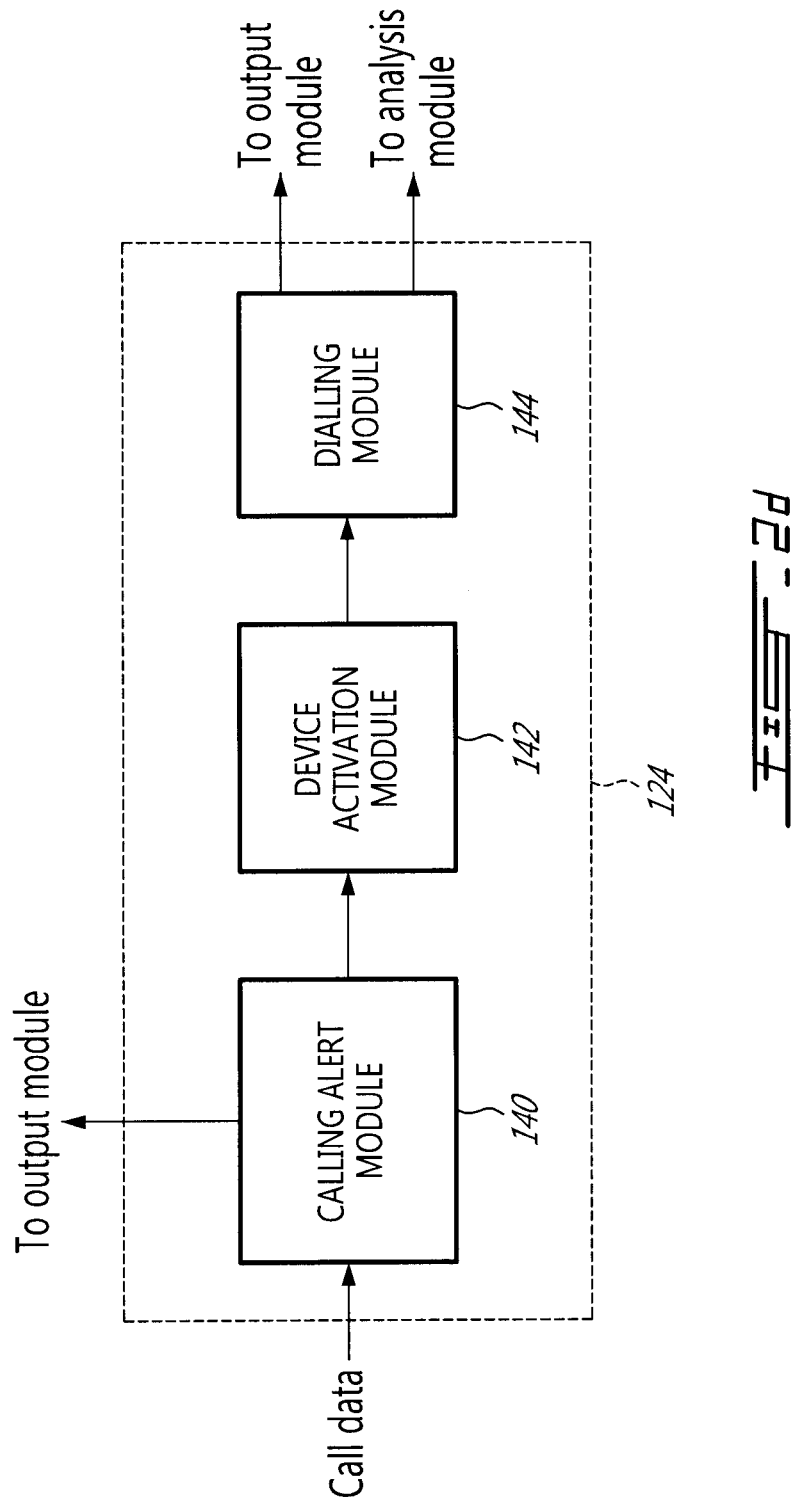

Referring to FIG. 2d, the calling module 124 illustratively comprises a calling alert module 140, a device activation module 142, and a dialling module 144. The calling alert module 140 illustratively receives the call data from the receiving module 118 and generates an alert to be presented on the interface of the reporting device $102_R$ attempting to make the call. The alert may be used to prevent inadvertent calls by indicating in which cases calls should be made. For example, when a request to make an emergency 911 call is received, the alert message may indicate that such a call is only to be made in case of a potentially life-threatening emergency. When a request to make a call to the Kid's Help Phone line is received, the alert message may indicate that such a call is only to be made when over the phone or online counselling, referral, or other crisis services are needed. The alert message may then be sent to the output module 126 for presentation on the device $102_R$.

Upon receiving a confirmation from the user for placing the call, the calling alert module 140 may then transfer the call data to the device activation module 142, which activates the phone of the reporting device $102_R$ to initiate the call. It should be understood that the device activation module 142 may also activate a browser (not shown) provided with the reporting device $102_R$. The device activation module 142 may then send a control signal comprising the call data to the dialling module 144 for the purpose of triggering the dialling of the call number specified in the call data. The dialling module 144 may also be prompted to launch a browser to navigate to a specific webpage or to launch a chatbox associated with the counselling services if counselling is to be provided online. It should be understood that any suitable application other than a browser or a chatbox may be launched in response to receiving the call data indicative of a request for contacting the counselling service. The dialling module 144 may further generate a message and send the message to the output module 126 for transmission to the device $102_R$ to indicate that the call has been made. The call confirmation may also be transmitted to the analysis module 128 so the latter may incorporate this information as follow-up data appended to the incident analyses.

Figure 3A:
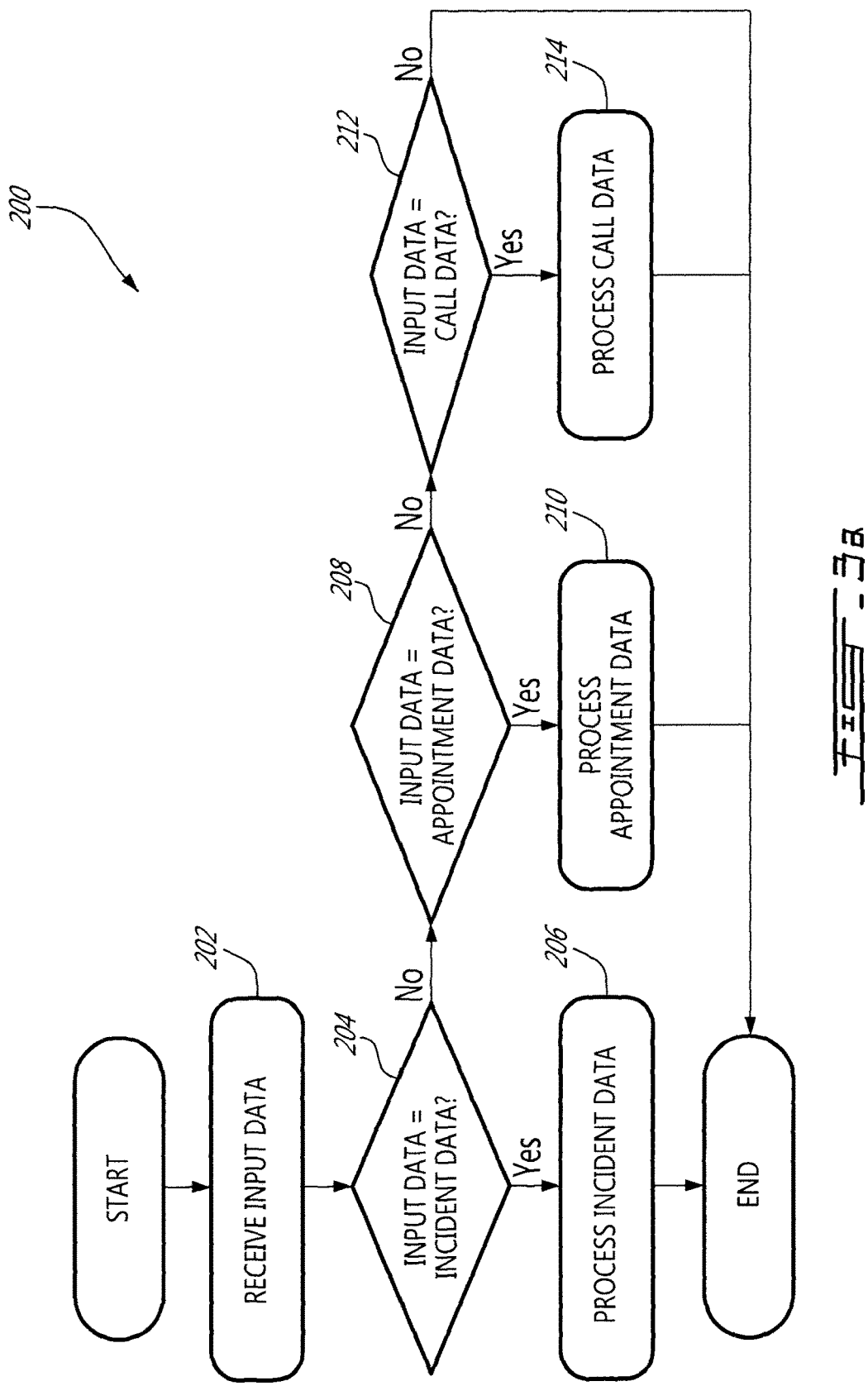
FIG. 3a is a flowchart of a method for reporting and tracking incidents, in accordance with an illustrative embodiment.

Referring to FIG. 3a, a method 200 for reporting incidents, such as bullying incidents, will now be described. The method 200 comprises the step 202 of receiving input data and the step 204 of determining whether the input data is incident data. If this is the case, the method 200 flows to the step 206 of processing the received incident data. Otherwise, the next step 208 is to determine whether the received input data is appointment data. If so, the appointment data is processed at step 210. Otherwise, the method 200 flows to the step 212 of determining whether the input data is call data. If this is the case, the next step 214 is to process the call data, otherwise the method 200 ends.

Referring to FIG. 3b, the step 206 of processing incident data comprises determining at step 216 whether the device (reference 102 in FIG. 1) from which the incident data has been received is an administrator device (reference $102_A$ in FIG. 1). If the device 102 is not an administrator device $102_A$, i.e. the device is a reporting device (reference $102_R$ in FIG. 1), the next step 218 may be to localize the device $102_R$, as discussed above. Once the coordinates of the device $102_R$ have been found, the method 200 flows to the step 220 of finding the school in closest proximity to the device $102_R$. The identified school may then be set as the preferred school at step 222. In this manner, any future incident data received from the device $102_R$ may be routed to this school. The presently received incident data may then be routed to the identified school at step 224. It should be understood that in cases where the device coordinates need not be sought, e.g. if the school to which the incident data should be sent is identified in the input data, as discussed above, the incident data may be routed to the specified school directly.

As discussed above, the school to which the incident data has been routed may decline the received data. The step 206 therefore comprises assessing at step 226 whether the school has declined the information package. If this is the case, the method 200 returns to the step 220 of searches for a nearest school. The process repeats until the information package is accepted by the school identified at step 220. Once the data has been accepted, a confirmation message may be output to at least the device $102_R$ at step 228. The incident data received by the system 104 may then be analyzed at step 230 and an incident analysis or study may be generated and output to the devices 102 at step 232 following such analysis. When the device $102_R$ from which the incident data is received is an administrator device $102_A$, it can be inferred that the incident data comprises an update to the incident details, as discussed above. As such, the method 200 illustratively flows directly from the assessment step 216 to the step 232 of updating a previously generated analysis. The method 200 may then end once the updated analysis has been output.

Referring to FIG. 3c, the step 210 of processing appointment data comprises determining at step 234 whether the device 102 from which the appointment data has been received is an administrator device $102_A$. If this is not the case, i.e. the data is received from a reporting device $102_R$, the next step 236 is to optionally localize the device. The method 200 may then search at step 238 for the school nearest to the device's location and set at step 240 the found school as a preferred school to which any future appointment data will be routed. The method 200 may then retrieve the school's appointment schedule at step 242 and search within this schedule for an available appointment date (step 244). If no date is found, the method 200 may return to step 238 and look for a new school. If an available date is found, the next step 246 may be to schedule the appointment by entering details thereof, e.g. date, time, location, in the school's appointment schedule and storing the appointment information in the databases 116.

It should be understood that if the school whose guidance counsellor the user wishes to meet is specified in the appointment data, the step 242 of retrieving the school's appointment schedule may occur directly after the step 234 of determining whether the device 102 is an administrator device $102_A$, i.e. without going through the process of localizing the device 102. The step 244 of searching for an available date may therefore comprise searching within the retrieved schedule for the date specified in the received appointment data. In addition, if the device 102 is an administrator device $102_A$, this implies that the received appointment data comprises an update to a previously scheduled appointment. The method 200 may therefore flow directly to the step 246 of updating the scheduled appointment.

As an appointment may be scheduled to a school other than the student's home school if the student is in proximity of a remote school, the scheduled appointment may be declined by the home school. The method 200 may therefore assess at step 248 whether this is the case, i.e. whether a rejection message has been received for the scheduled appointment. If the appointment has indeed been rejected, the method 200 return to the step 238 of finding the nearest school. Otherwise, users and/or administrators may be notified at step 250 by transmitting a notification to the devices $102_A$ and $102_R$, as discussed above. The appointment data may further be used to generate an incident analysis at step 252 or update a previously generated incident analysis if an appointment update is received. The incident analysis may also be output to the devices $102_A$ and $102_R$.

Figure 3D:
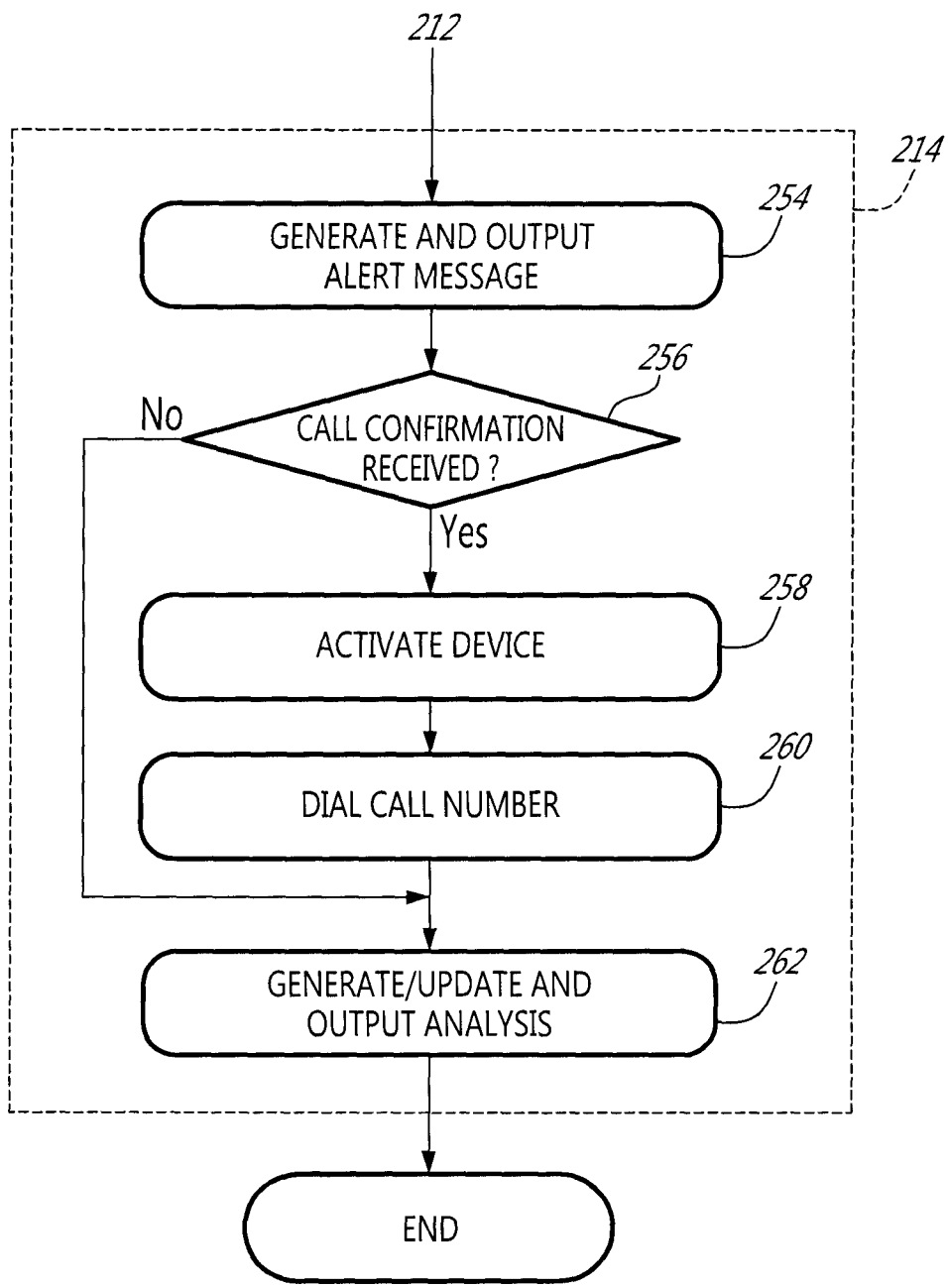
FIG. 3d is a flowchart of the step of FIG. 3a of routing a call.

Referring to FIG. 3d, the step 214 of processing call data illustratively comprises at step 254 generating and outputting an alert message to prevent any inadvertent calls, as discussed above. The method 200 may then determine at step 256 whether a call confirmation has been received. If this is the case, the phone and/or browser of the device $102_R$ may be activated at step 258. The call number indicated in the received call data may then be dialled at step 260. At step 262, an incident analysis may then be generated or updated using the received call data. If no call confirmation has been received after the alert message has been output, the method 200 may directly flow to step 262 of generating/updating and outputting an incident analysis. Because calls to 911 or Kid's Help Phone are illustratively only made from a reporting device $102_R$, the step 214 does not comprise determining whether the device 102 from which the call data has been received is an administrator device $102_A$ or a reporting device $102_R$.

FIG. 4 illustrates a screen capture of a main interface 300 presented on a reporting device $102_R$ accessing the system 104. The interface 300 comprises a plurality of control elements or options presenting the various features available to the user. In one embodiment, the interface 300 comprises an "Upload Photo" option 302, an "Upload Audio Recording" option 304, a "Schedule Appointment" option 306, a "Your Messages" option 308, a "Call Kid's Help Phone" option, and an "Emergency! Call 911" option 312. Additional options, such as a video upload option (not shown) may also be provided. When the user selects any one of the options 302, 304, 306, 308, 310, and 312 using an input device, such as a touchscreen, a mouse, or the like (not shown) provided with the device $102_R$, access to the corresponding feature of the system 104 may be provided. For instance, selection of the "Your Messages" option 308 provides the user access to any messages received from the output module 126.

Figure 5A:
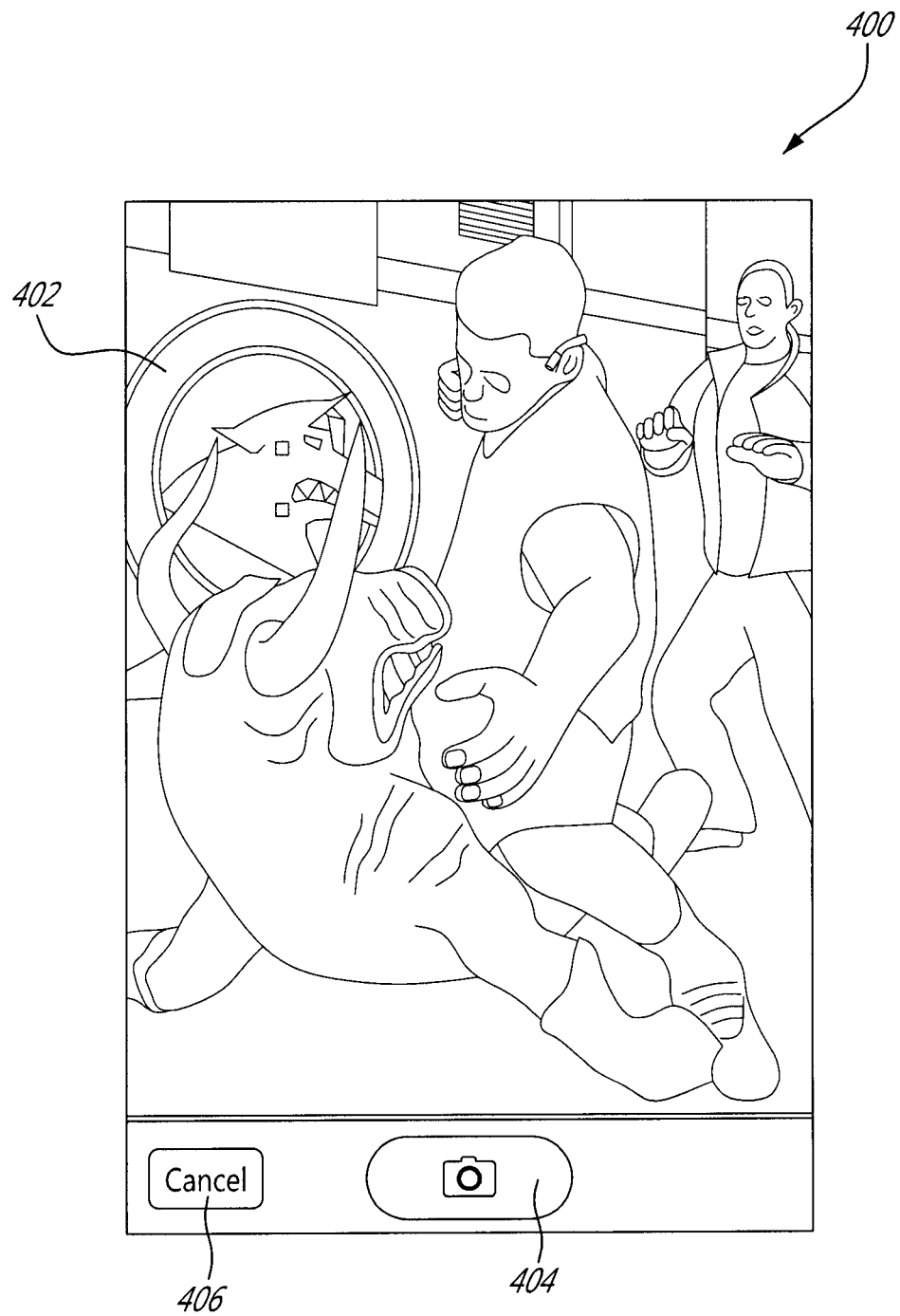
FIG. 5a is a screen capture of a user interface for uploading incident data, in accordance with an illustrative embodiment.

Referring to FIG. 5a, the user may for example select the "Upload Photo" option 302. As a result, the device's media capture device, i.e. the camera, may be activated to enable the user to capture a photo of the bullying incident. The device $102_R$ may also present an interface 400, which shows a preview 402 of the bullying incident that may be captured.

A capture option 404 may also be presented, which when selected results in the camera taking a picture of the currently previewed incident. A cancel option 406 may further be provided to allow the user to cancel the capturing process if desired.

Referring to FIG. 5b, once the photo has been captured, an interface 500 may be presented on the device $102_R$ to enable the user to optionally provide additional information about the bullying incident. For this purpose, a plurality of user interface elements, such as text boxes allowing for several lines of free text to be entered, are provided to enable the user to submit data about the incident. For example, the user may submit the bully's name in a "Bully" box 502, the victim's name in a "Victim" box 504, and additional relevant details, such as the names of witnesses or the like, if any, in a "Details" box 506. It should be understood that control elements other than the text boxes 502, 504, and 506 may be used. A "Skip" option 508 may further be provided to enable the user to skip the optional step of entering the above-mentioned information.

Figure 5C:
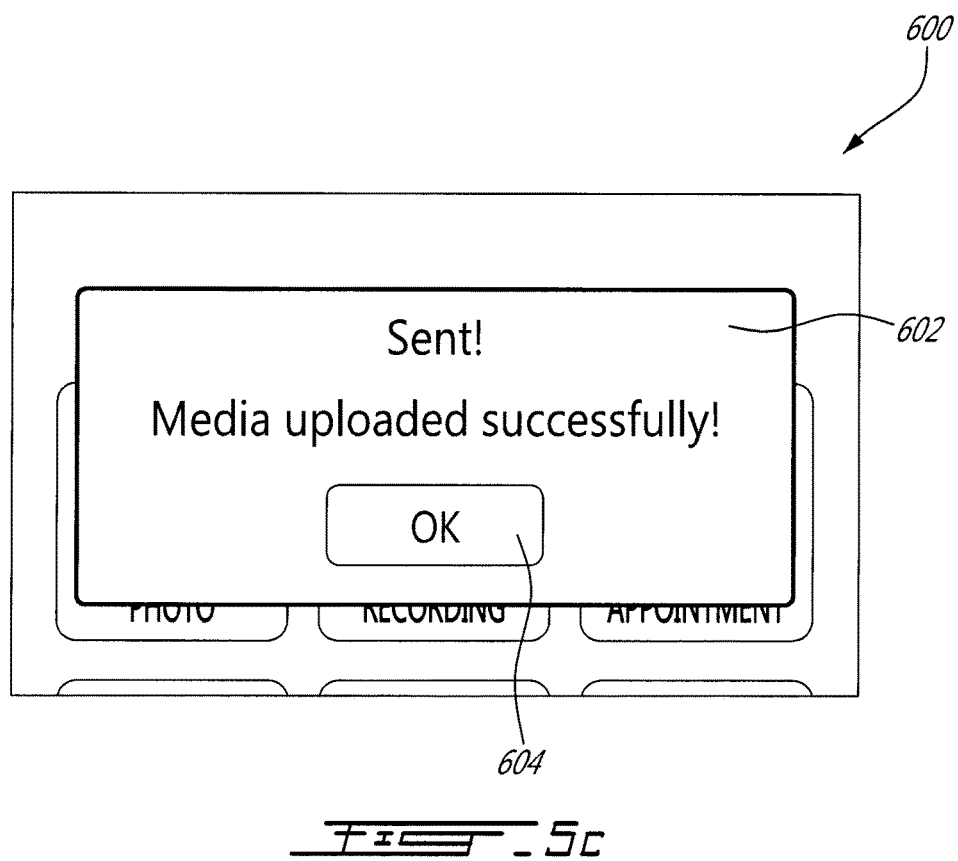
FIG. 5c is a screen capture of the user interface of FIG. 5a with a pop-up confirmation message.

Referring to FIG. 5c, once the user has provided the optional information, an interface 600 may be presented to display a confirmation message 602 indicating that the incident data has been successfully uploaded to the system 104. The user may then select an "Ok" option 604 to exit the uploading process and return to the main interface 300. Alternatively, the interface 600 may be presented for a short period of time, e.g. five (5) seconds, prior to automatically returning to the main interface 300. It should be understood that a process similar to the one described above with reference to uploading a photo may be used to upload an audio recording or a video. Once uploaded, the incident data may then be sent to the appropriate institution, e.g. the school where the incident occurred, as discussed above.

FIG. 6 illustrates an interface 700 presented on the reporting device $102_R$ to enable a user to send an anonymous request for a guidance counsellor appointment. The interface 700 may be presented upon selection on the main interface 300 of the "Schedule appointment" option 306. The interface 700 illustratively comprises a plurality of interface elements, such as drop-down menus 702 and 704 that allow the user to select a school whose guidance counsellor they wish to meet and select a desired appointment date respectively. For example, the drop-down menu 702 may display a list of schools whose guidance counsellors the user may take an appointment with. The list may comprise a predetermined number, e.g. five (5), of schools in closest proximity with the reporting device $102_R$. The drop-down menu 704 may further display a list of appointment dates the user can choose from. For example, if the current date is Monday, the available date options may comprise "Today", "Tomorrow", "Wednesday", etc. Although not illustrated, additional drop-down menus may be provided to select the desired time and location (e.g. library, cafeteria, etc.) within the school for the appointment. Once the selection has been made, the user may then submit the request by selecting a "Submit Request" option 706 displayed on the interface 700. The user may also return to the main interface 300 by selecting a "Back" option 708.

Referring to FIG. 7, a 911 call interface 800 may be presented on the reporting device $102_R$ once the user selects the "Emergency! Call 911" option 312 on the main interface 300. The interface 800 illustratively comprises an alert section 802. An alert message indicating when to use the call 911 feature may be presented within the alert section 802 to prevent inadvertent emergency calls. A "Call" confirmation option 804 may be selected to confirm that the 911 call is to be made, thereby prompting the device $102_R$ to dial the 911 number.

Referring to FIG. 8, a Kid's Help Phone call interface 900 may be presented on the reporting device $102_R$ once the user selects the "Call Kid's Help Phone" option 310 on the main interface 300. The interface 900 illustratively comprises an alert section 902 in which an alert message indicating when to use the Kid's Help Phone feature may be presented to prevent inadvertent calls. A "Call" confirmation option 904 may be selected to confirm that the call to the Kid's Help Phone line is to be made, thereby prompting the device $102_R$ to dial the Kid's Help Phone number.

Figure 9A:
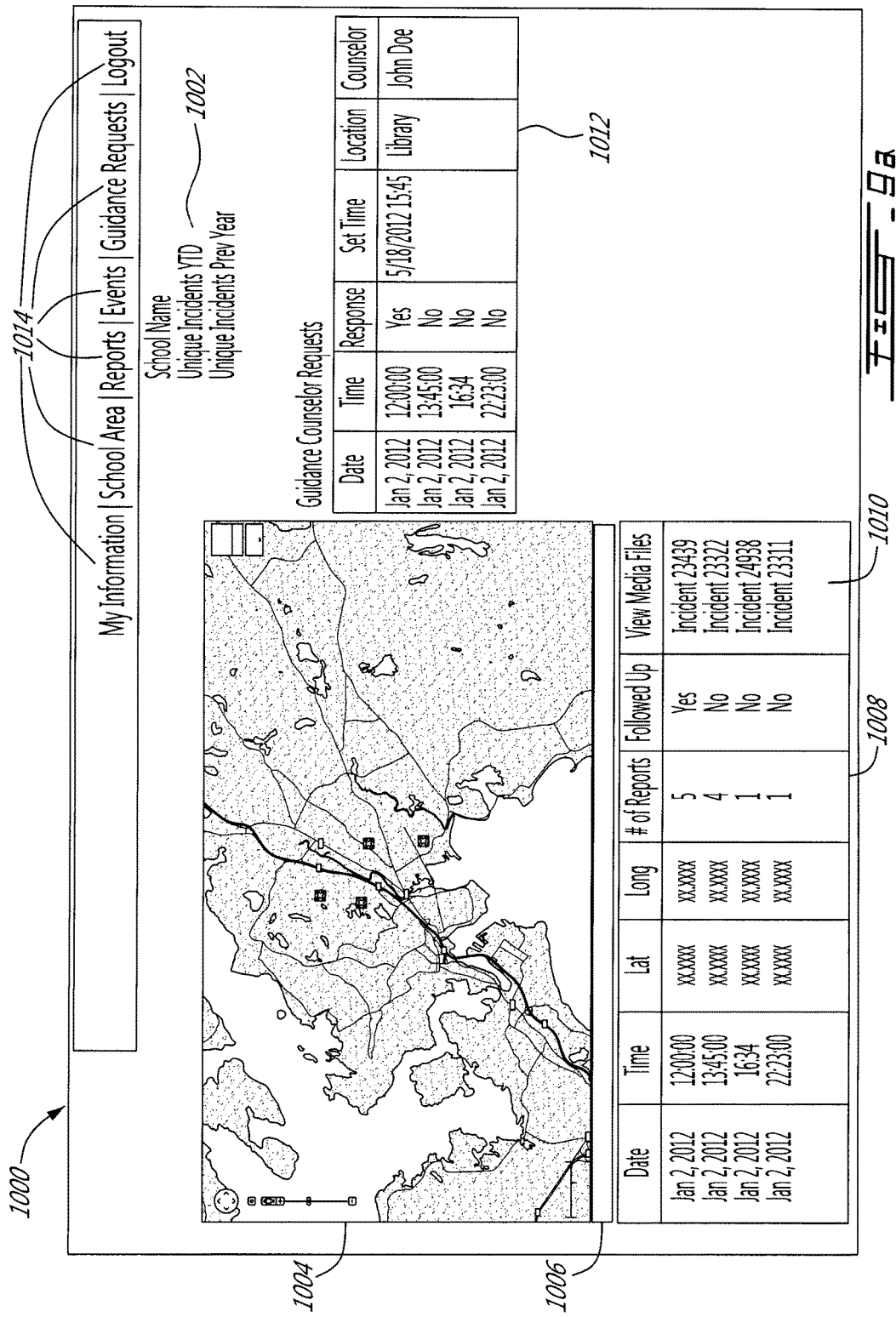
FIG. 9a is a screen capture of a administrator interface, in accordance with an illustrative embodiment.

FIG. 9a shows an administrator interface 1000 displayed on an administrator device $102_A$. The interface 1000 illustratively presents incident reports so that administrators, such as school officials, may review instances of bullying within their geographical area. General information may be presented in a summary section 1002. This information includes, but is not limited to, the name of the school for which the incident report has been drawn up, the total number of bullying incidents reported for that school during the current year, and the number of bullying incidents reported for the same school the previous year.

The interface 1000 may further comprise a map section 1004 adapted to display on a map of a geographical area under study the location of reported bullying incidents. The geographical area may be defined using a zooming feature (not shown) provided on the map section 1004. The user may further adjust the time scale using a slider 1006. As the date/time is adjusted with the slider 1006, the incidents displayed on the map section 1004 are illustratively updated accordingly. In this manner, the administrator can view bullying incidents having occurred over any given period of time for any geographical location. In turn, it is possible to determine bullying patterns and thereby assist administration and officials develop preventive measures.

A table 1008 describes the incidents presented in the map section 1004 in the date/time range selected using the slider 1006. The table 1008 presents a tabular view of the map data including detailed incident data, such as the date and time of each reported bullying incident, the location of the incident (latitude and longitude coordinates), and the number of reported incidents at each location.

The media files uploaded using reporting devices $102_R$ may also be listed in a media file section 1010. Each media file may be associated with a link or option, which, when selected by the administrator, displays the corresponding media file on the interface 1000. As such, the uploaded data may be accessed directly from the interface 1000.

An appointment table 1012 may further be displayed to indicate the guidance counsellor requests received in relation to each reported bullying incident. In particular, table 1012 describes in tabular view whether an appointment has been scheduled in response to a received request, the date, time, and location of the scheduled appointment, if any, as well as the name of the counsellor with whom the appointment has been made. Guidance counsellor requests are illustratively presented and refreshed in real time, e.g. every minute. The administrator can therefore follow-up on the requests and particularly track open requests, which have yet to be answered.

A plurality of interface elements, such as options as in 1014, allow the administrator to navigate to various interfaces and obtain different information, such as detailed information about guidance counsellor requests or about incident reports.

Figure 9B:
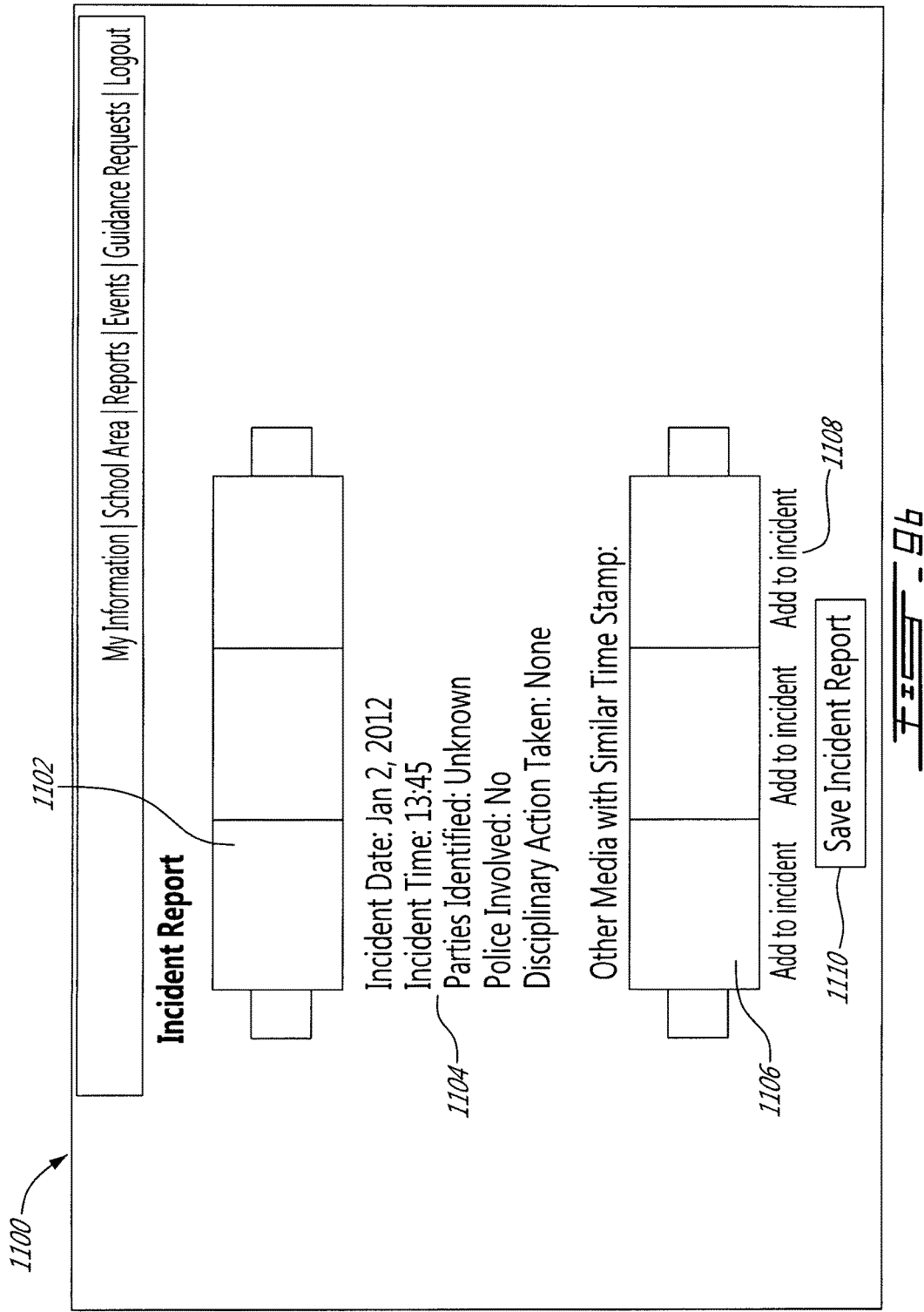

For example, referring to FIG. 9b, an incident report interface 1100 may be presented on the administrator device 102$_A$ upon the administrator selecting the "Reports" option 1014. The incident report interface 1100 illustratively comprises a media file section 1102, which displays the media file(s) uploaded by a user for the incident report at hand. The incident data, e.g. incident date, time, parties involved, if known, submitted when the user reported the bullying incident may further be displayed in an incident data section 1104. The interface 1100 may also present media files that were previously uploaded in the system 104 when reporting past incidents and whose time stamp is similar to that of the present incident report. These previous media files may be retrieved from the databases 116 for presentation in an "Other media" section 1106. In this manner, the administrator is able to view both the newly uploaded media files 1102 and the previously uploaded media files 1106 concurrently.

The administrator may then correlate both the present incident and previous incidents to determine whether a previous media file 1106 is relevant to the present case. If so, the administrator may associate the previous media file 1106 to the present incident report by selecting a corresponding "Add to incident" option 1108. The incident data section 1104 may further be modified by the administrator who may enter additional details about the bullying incident, if known. For example, the administrator may identify the involved parties, or indicate whether the police has been involved or if a disciplinary action has been taken. In particular, the involved parties may be identified by the administrator upon viewing the previous media file 1106 relevant to the present incident. The incident report may then be saved in the databases 116 by selecting the corresponding option 1110.

Figure 9C:
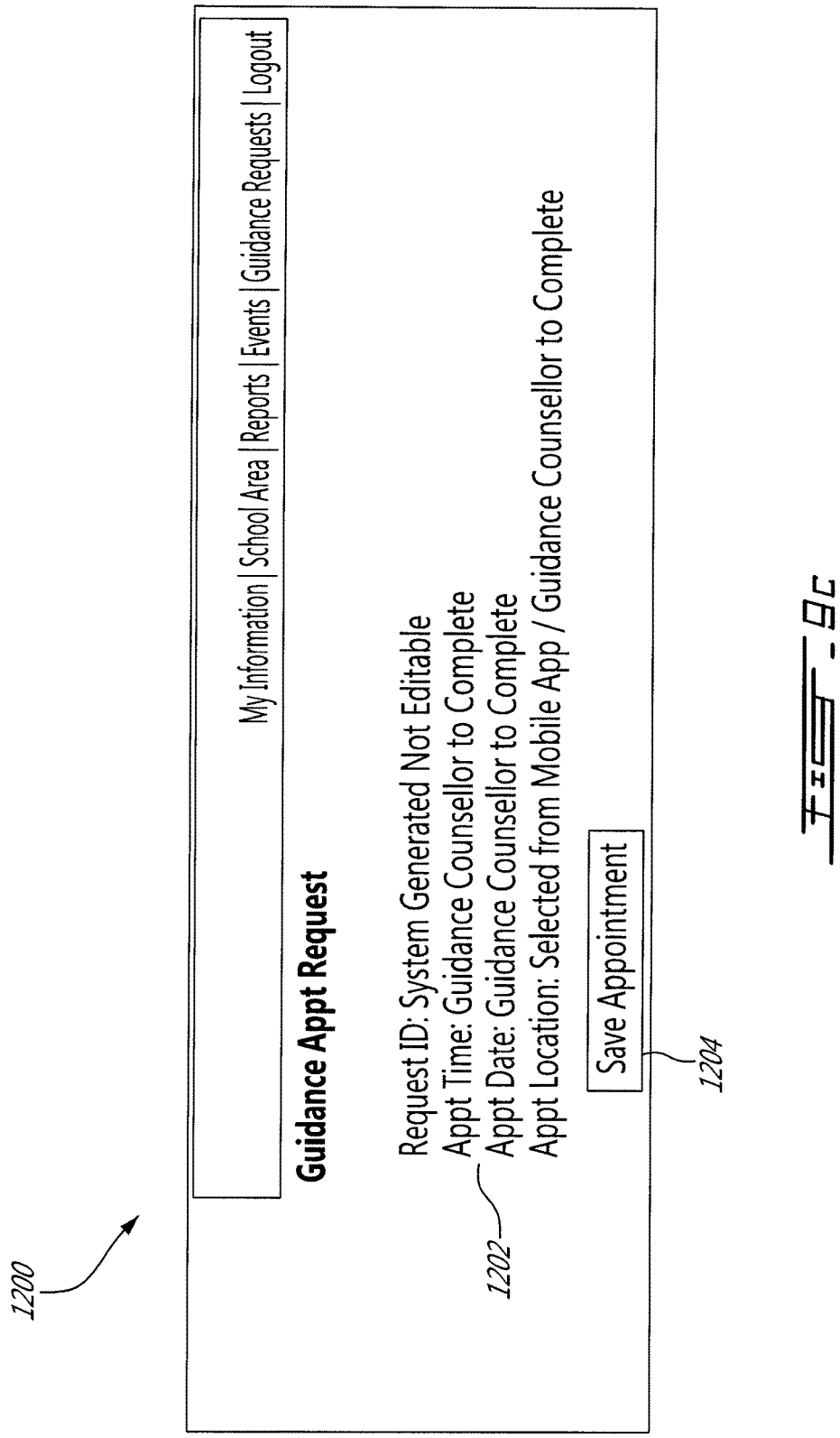

Referring to FIG. 9c, a guidance appointment request interface 1200 may be presented on the administrator device 102$_A$ upon the administrator selecting the "Guidance Requests" option 1014. The guidance appointment request interface 1200 illustratively comprises an appointment details section 1202 that provides the request identifier associated with the guidance request. The appointment details section 1202 may be edited by the administrator. In particular, the administrator may specify the appointment time and date. The location may also be presented in the appointment details section 1202. This location information may be retrieved from the appointment data received from the reporting device 102$_R$ or it may be specified by the administrator via the interface 1200. Once the guidance appointment request information has been updated, the appointment details may be saved in the databases 116 by selecting the "Save Appointment" option 1204.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment. It should be noted that the present invention can be carried out as a method, can be embodied in a system, and/or a computer readable medium. The embodiments of the invention described above are intended to be exemplary only. The scope of the invention is therefore intended to be limited solely by the scope of the appended claims.

The invention claimed is:

1. A system for incident reporting, the system comprising:
   a memory;
   a processor; and
   at least one first application stored in the memory and executable by the processor for:
   providing a graphical user interface for use on a mobile device for reporting an undergoing incident, the mobile device connected to a network;
   receiving from the mobile device, via the graphical user interface, a request for reporting the incident;
   in response to receiving the request, activating a media capture device provided on the mobile device and causing the media capture device to record media related to the incident while the incident is occurring;
   receiving incident data from the mobile device in real-time while the incident is occurring, the incident data comprising the recorded media,
   determining from the incident data at least one organization the incident is to be reported to, and
   transmitting the incident data to the at least one organization.

2. The system of claim 1, wherein the at least one first application is executable by the processor for causing the media capture device to record the media comprising at least one of a still image, a moving image, and a sound.

3. The system of claim 2, wherein the at least one first application is executable by the processor for receiving, from the mobile device, identification data identifying at least one of a perpetrator of the incident, a victim of the incident, and a witness of the incident.

4. The system of claim 2, wherein the memory has stored therein at least one call number for at least one crisis service and wherein the at least one first application is executable by the processor for receiving, from the mobile device, call data indicative of a request to contact the at least one crisis service, retrieving from the memory the at least one call number, and causing the mobile device to initiate a call in accordance with the retrieved at least one call number.

5. The system of claim 2, wherein the at least one first application is executable by the processor for receiving from the mobile device a request to contact a crisis service and for causing a second application to be launched on the mobile device in accordance with the request for providing access to the crisis service.

6. The system of claim 2, wherein the memory has stored therein location data indicative of a geographic location associated with each one of a plurality of organizations and wherein the at least one first application is executable by the processor for receiving the incident data from the mobile device, determining from the received incident data a position of the mobile device, retrieving the location data from the memory, comparing the position to the retrieved location data for determining one or more of the plurality of organizations within a predetermined distance of the mobile device, identifying the one or more of the plurality of organizations as the at least one organization, and transmitting the incident data to the geographic location associated with the identified one or more of the plurality of organizations.

7. The system of claim 1, wherein the memory has stored therein location data indicative of a geographic location associated with each one of a plurality of organizations and wherein the at least one first application is executable by the processor for receiving the incident data comprising an indication of a selected one of the plurality of organizations the incident relates to, the selected one of the plurality of organizations being the at least one organization, retrieving from the memory the geographic location associated with the selected one of the plurality of organizations, and transmitting the incident data to the retrieved geographic location.

8. The system of claim 1, wherein the at least one first application is executable by the processor for transmitting the incident data to the at least one organization comprising outputting the incident data to at least one administrator device provided at the at least one organization.

9. The system of claim 8, wherein the at least one first application is executable by the processor for receiving from the at least one administrator device rejection data indicative of a rejection of the incident data outputted thereto, determining in response to the received rejection data an alternative organization the incident is to be reported to, and transmitting the incident data to the alternative organization.

10. The system of claim 1, wherein the memory has stored therein past incident data indicative of at least one past incident for the at least one organization and wherein the at least one first application is executable by the processor for retrieving from the memory the past incident data and for generating at least one incident analysis in accordance with one of the retrieved past incident data and a correlation between the retrieved past incident data and the received incident data.

11. The system of claim 10, wherein the at least one first application is executable by the processor for receiving update data indicative of at least one modification to be made to the past incident data and modifying the past incident data in accordance with the update data.

12. The system of claim 1, wherein the memory has stored therein schedule data indicative of a schedule of appointments for a crisis service provided at the at least one organization and wherein the at least one first application is executable by the processor for receiving appointment data indicative of a request for an appointment with the crisis service, retrieving the schedule data from the memory, determining from the retrieved schedule data whether the crisis service is available to satisfy the request, and, if the crisis service is available, updating the retrieved schedule data with the appointment data.

13. A computer-implemented method for reporting an incident, the method comprising executing on a processor program code for:
providing a graphical user interface for use on a mobile device for reporting an undergoing incident, the mobile device connected to a network;
receiving from the mobile device, via the graphical user interface, a request for reporting the incident;
in response to receiving the request, activating a media capture device provided on the mobile device and causing the media capture device to record media related to the incident while the incident is occurring;
receiving incident data from the mobile device in real-time while the incident is occurring, the incident data comprising the recorded media;
determining from the incident data at least one organization the incident is to be reported to; and
transmitting the incident data to the at least one organization.

14. The method of claim 13, wherein the media capture device is caused to record the media comprising at least one of a still image, a moving image, and a sound.

15. The method of claim 14, further comprising receiving, from the mobile device, call data indicative of a request to contact at least one crisis service, retrieving at least one call number for the at least one crisis service from a memory having stored therein the at least one call number, and causing the mobile device to initiate a call in accordance with the retrieved at least one call number.

16. The method of claim 14, further comprising receiving, from the mobile device, a request to contact a crisis service and causing an application to be launched on the mobile device in accordance with the request for providing access to the crisis service.

17. The method of claim 14, further comprising receiving the incident data from the mobile device, determining from the received incident data a position of the mobile device, retrieving location data indicative of a geographic location associated with each one of a plurality of organizations from a memory having stored therein the location data, comparing the position to the retrieved location data for determining one or more of the plurality of organizations within a predetermined distance of the mobile device, identifying the one or more of the plurality of organizations as the at least one organization, and transmitting the incident data to the geographic location associated with the identified one or more of the plurality of organizations.

18. The method of claim 13, further comprising receiving the incident data comprising an indication of a selected one of a plurality of organizations the incident relates to, the selected one of the plurality of organizations being the at least one organization, retrieving a geographic location associated with the selected one of the plurality of organizations from a memory having stored therein location data indicative of the geographic location associated with each one of the plurality of organizations, and transmitting the incident data to the retrieved geographic location.

19. The method of claim 13, wherein transmitting the incident data to the at least one organization comprises outputting the incident data to at least one administrator device provided at the at least one organization.

20. The method of claim 19, further comprising receiving from the at least one administrator device rejection data indicative of a rejection of the incident data outputted thereto, determining in response to the received rejection data an alternative organization the incident is to be reported to, and transmitting the incident data to the alternative organization.

21. The method of claim 13, further comprising retrieving past incident data indicative of at least one past incident for the at least one organization from a memory having stored therein the past incident data and generating at least one incident analysis in accordance with one of the retrieved past incident data and a correlation between the retrieved past incident data and the received incident data.

22. The method of claim 14, further comprising receiving appointment data indicative of a request for an appointment with a crisis service provided at the at least one organization, retrieving a schedule data indicative of a schedule of appointments for the crisis service from the memory, determining from the retrieved schedule data whether the crisis service is available to satisfy the request, and, if the crisis service is available, updating the retrieved schedule data with the appointment data.

23. A non-transitory computer readable medium having stored thereon program code executable by a processor for reporting an incident, the program code executable for:

providing a graphical user interface for use on a mobile device for reporting an undergoing incident, the mobile device connected to a network;
receiving from the mobile device, via the graphical user interface, a request for reporting the incident;
in response to receiving the request, activating a media capture device provided on the mobile device and causing the media capture device to record media related to the incident while the incident is occurring;
receiving incident data from the mobile device in real-time while the incident is occurring, the incident data comprising the recorded media;
determining from the incident data at least one organization the incident is to be reported to; and
transmitting the incident data to the at least one organization.

\* \* \* \* \*